(12) United States Patent
Ito et al.

(10) Patent No.: US 6,288,475 B1
(45) Date of Patent: Sep. 11, 2001

(54) ULTRASONIC MOTOR

(75) Inventors: Motoaki Ito; Yoshiyo Wada, both of Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 0 days.

(21) Appl. No.: 09/623,002

(22) PCT Filed: Feb. 26, 1999

(86) PCT No.: PCT/JP99/00913

§ 371 Date: Aug. 24, 2000

§ 102(e) Date: Aug. 24, 2000

(87) PCT Pub. No.: WO99/44279

PCT Pub. Date: Sep. 2, 1999

(30) Foreign Application Priority Data

Feb. 27, 1998 (JP) ................................................... 10-47972
Apr. 28, 1998 (JP) ................................................. 10-119360
Apr. 30, 1998 (JP) ................................................. 10-121025

(51) Int. Cl.$^7$ .................................................. H02N 2/00
(52) U.S. Cl. ............................... 310/323.01; 310/323.03
(58) Field of Search .................... 310/323.01, 323.02, 310/323.03

(56) References Cited

U.S. PATENT DOCUMENTS 5,540,615 * 7/1996 Murtuza ................................ 451/343
5,872,416 * 2/1999 Nogarede ......................... 310/323.01

FOREIGN PATENT DOCUMENTS

| 2-179281 | 7/1990 | (JP) | H02N/2/00 |
| 2-96612 | 8/1990 | (JP) | G11B/5/52 |
| 4-71371 | 3/1992 | (JP) | H02N/2/00 |
| 7-73421-A * | 3/1995 | (JP) | 310/323.01 |
| 7-154981 | 6/1995 | (JP) | H02N/2/00 |

* cited by examiner

Primary Examiner—Thomas M. Dougherty
(74) Attorney, Agent, or Firm—Wenderoth, Lind & Ponack, L.L.P.

(57) ABSTRACT

An ultrasonic motor 1 comprises a stator-side elastic member 30 having a rotationally symmetrical shape, a rotor-side elastic member 40 having a rotationally symmetrical shape, a stator-side piezoelectric element 31 for imparting vibrations to the elastic member 30, a rotor-side piezoelectric element 41 for imparting vibrations to the elastic member 40, an output shaft 10 rotating integrally with the elastic member 40, a rotary transformer 60 for supplying power to the piezoelectric element 41 in non-contacting fashion, and housings 21 and 22 for accommodating therein the above-enumerated elements, wherein of three transformer circuits in the rotary transformer 60, a middle transformer circuit C2 and an outermost transformer circuit C3 are used as a two-phase drive power transformer circuit. This construction achieves stable power supply to the rotor side.

11 Claims, 13 Drawing Sheets

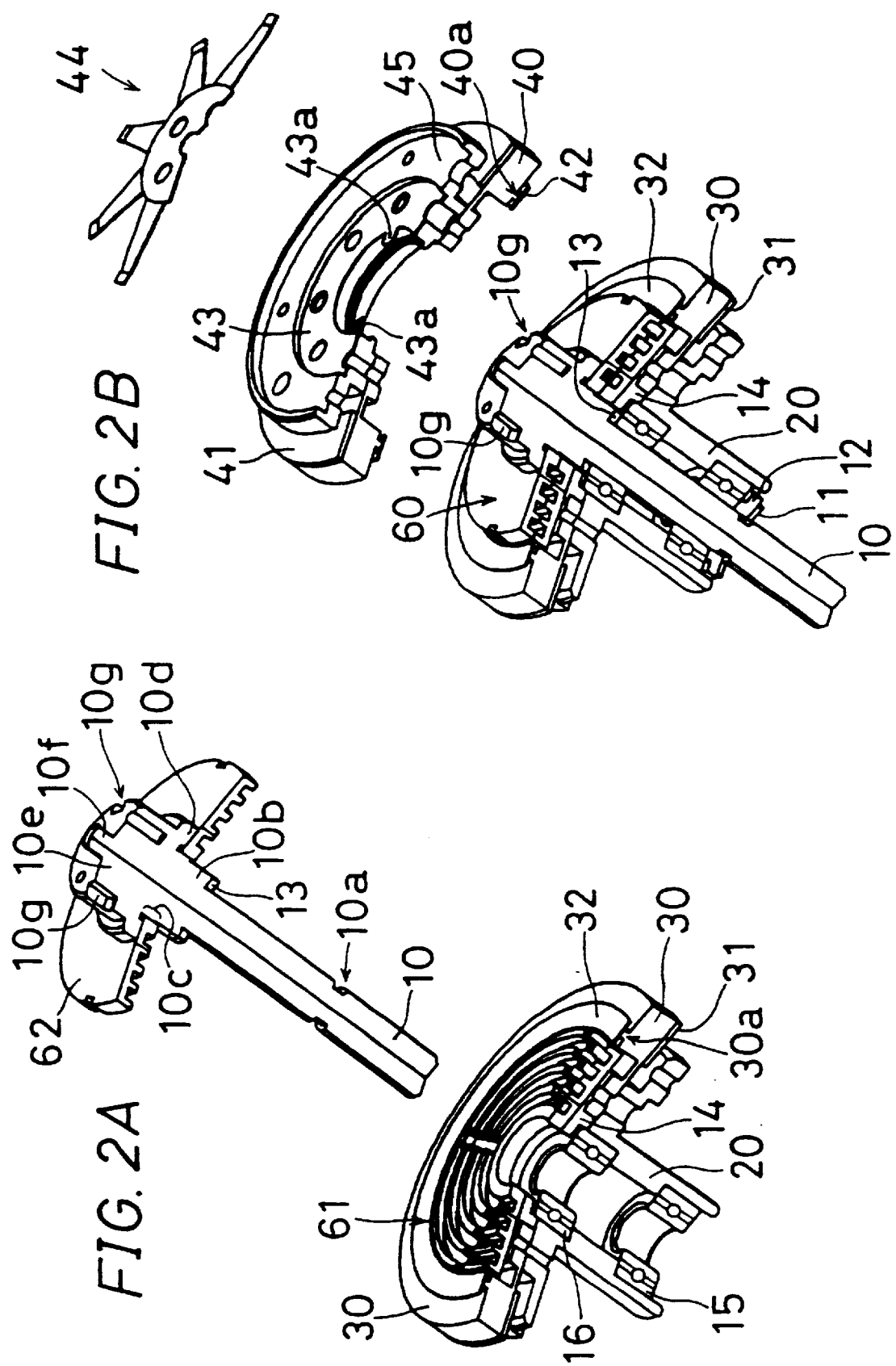

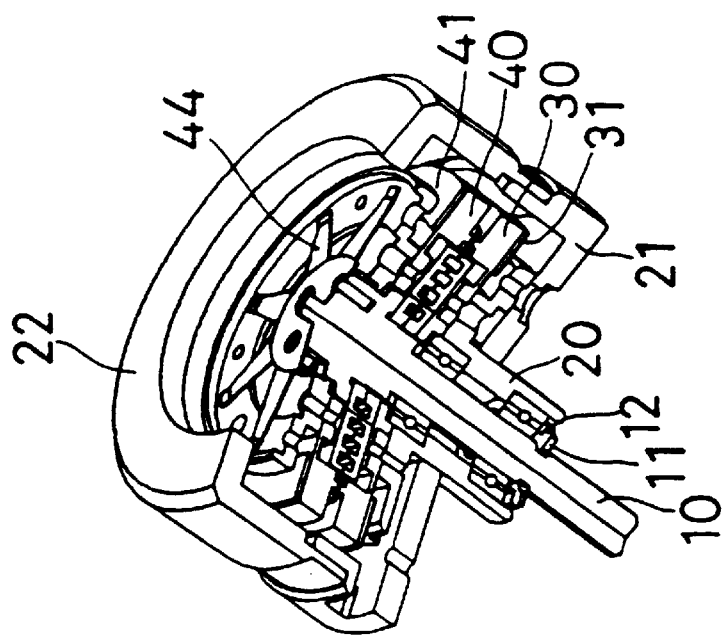
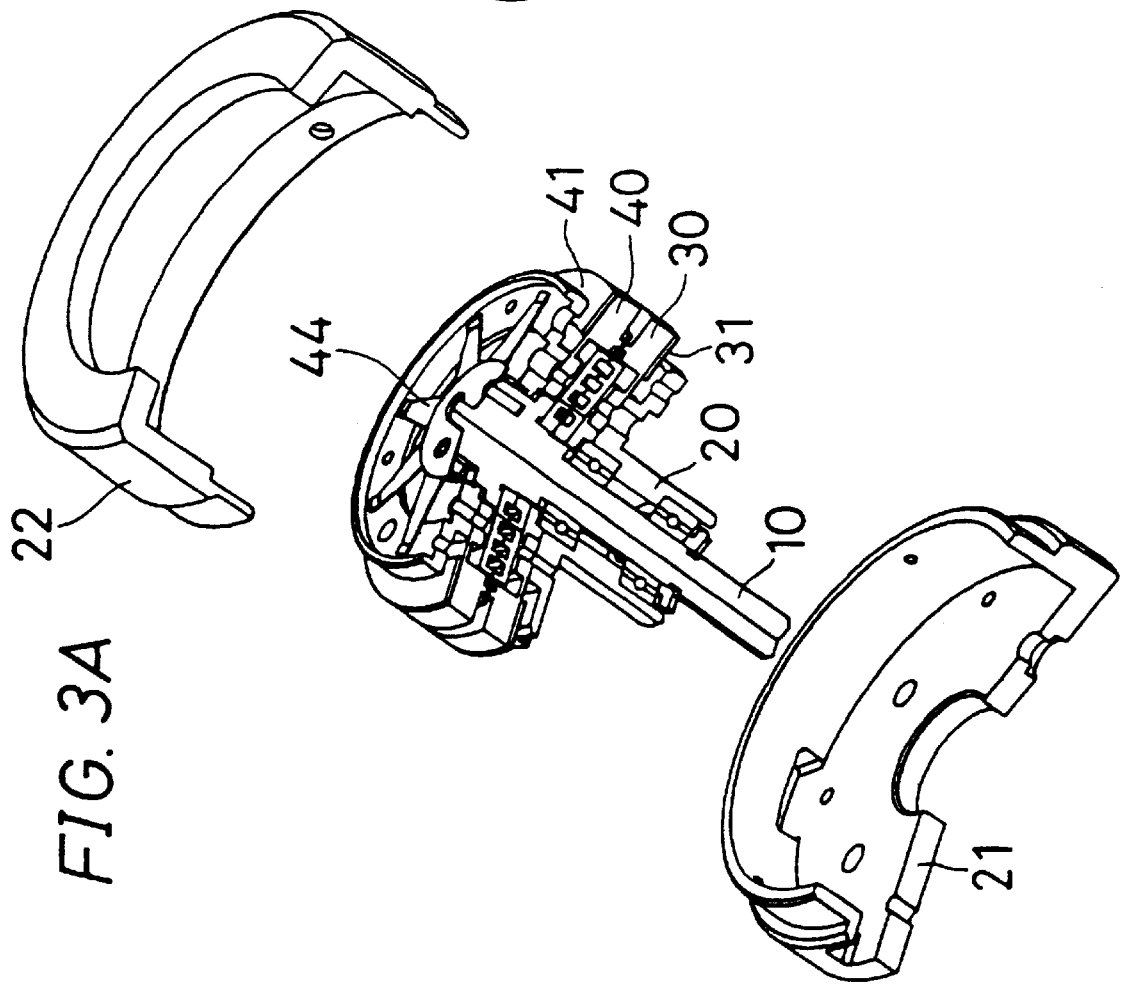

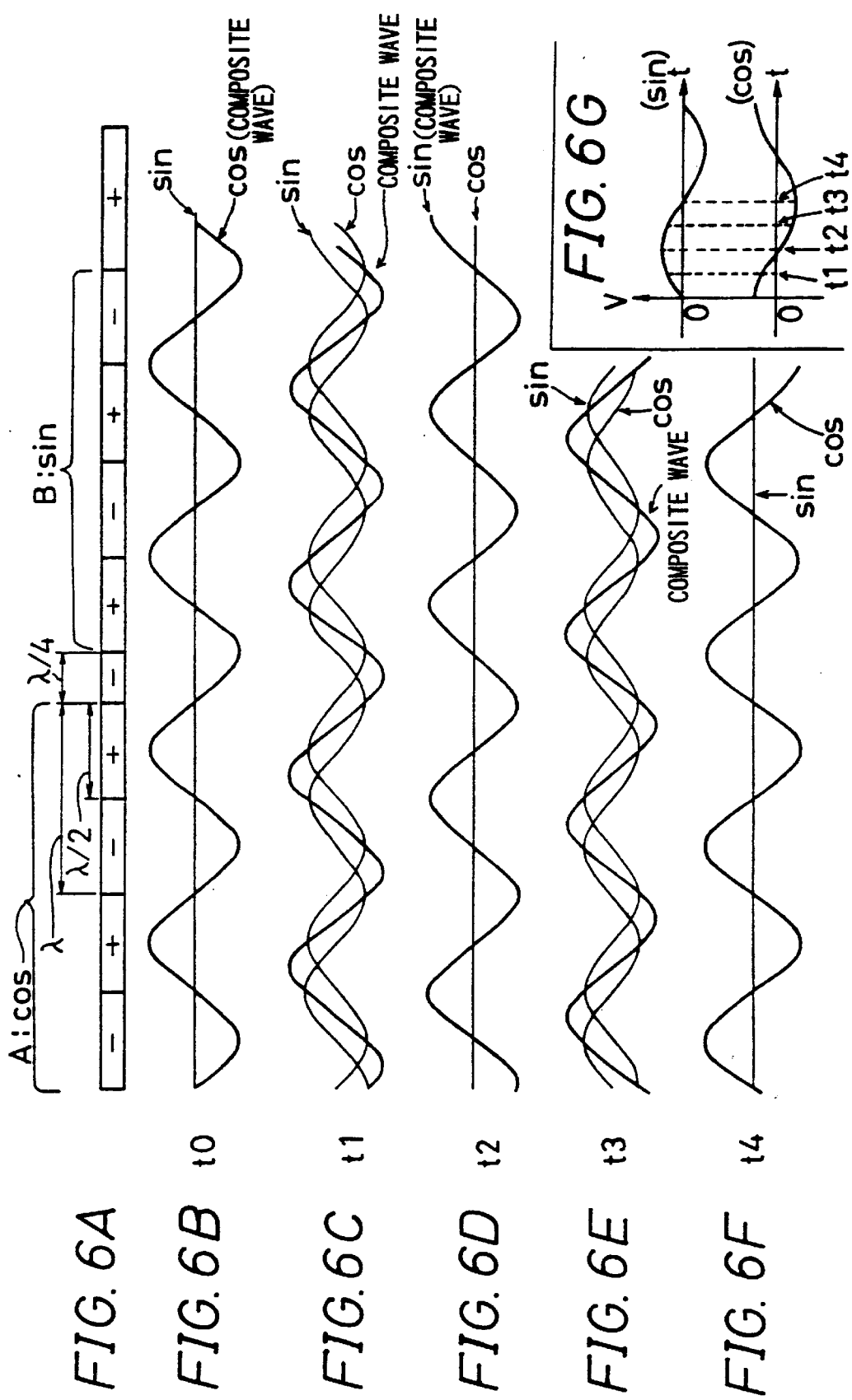

ULTRASONIC MOTOR

TECHNICAL FIELD

The present invention relates to an ultrasonic motor wherein rotational displacement waves are generated on press-contact faces of a stator and rotor and a rotational motion is produced proportional to a frequency difference between two rotational displacement waves. The invention also relates to an ultrasonic motor wherein a rotational motion is produced by generating a rotational displacement wave on a press-contact face of a rotor.

BACKGROUND ART

A conventional traveling wave ultrasonic motor comprises an annular stator and an annular rotor which are pressed together in contacting fashion, and an annular piezoelectric element bonded to a back surface of the stator, wherein in operation, the piezoelectric element is excited to generate a traveling wave on a press-contact face of the stator, and an elliptical motion at contact points is converted into a rotational motion of the rotor (reference is made to Takashi Kenjo and Toshiiku Sashida, "An Introduction to Ultrasonic Motors", Sogo Denshi Shuppan, 1991).

Ultrasonic motors of this type, compared with electromagnetic motors, have the advantage of being able to achieve compact and light weight construction owing to the lack of need for magnetic circuits such as a coil winding and an iron core and yet to produce high torque at slow rotational speed, and are commercially implemented in the fields of camera lens rotating mechanisms, robot actuators etc.

Since the conventional ultrasonic motor is of the type that the rotor is frictionally driven by generating a traveling wave on the surface of the stator, in order to generate a traveling wave of large amplitude a piezoelectric element formed of a piezoelectric material having sharp resonance is driven to resonate at its resonant frequency. Consequently, when it is desired to control the rotational speed of the rotor in a variable manner, the traveling wave drive frequency or drive voltage must be varied, but when the drive frequency or drive voltage of the piezoelectric element is varied, the vibration output of the piezoelectric element will drop abruptly or the torque will change. As a result, variable control of the rotational speed is extremely difficult to achieve in the conventional ultrasonic motor and, in practice, the use of this type of ultrasonic motor is limited to applications where on-off control of a constant rpm output is performed, just like typical DC motors.

In view of the above situation, a double drive-type ultrasonic motor has been proposed in which piezoelectric elements are attached to both the stator and the rotor so that the rotational speed of the rotor can be controlled in a continuously variable manner by the interaction between the traveling wave on the stator and the traveling wave on the rotor (Japanese Unexamined Patent Publication JP-A 2-179281 (1990) Japanese Examined Patent Publication JP-B2 2663164).

In this double drive-type ultrasonic motor, since the rotor is also provided with a piezoelectric element, power must be supplied to the rotating piezoelectric element by a suitable means.

In the ultrasonic motor described in JP-A 2-179281, the rotor and stator are housed within a case, an annular conductive plate is disposed on the upper surface of a rotor-side elastic member (the surface facing the interior surface of the upper wall portion of the case), and a conductive brush which contacts the conductive plate in rubbing fashion is fixed to the interior surface of the case so as to face the conductive plate, wherein a signal of a given frequency is supplied to the rotatable piezoelectric element at the rotor side via a power feed unit consisting of the conductive brush and the conductive plate.

In this ultrasonic motor, however, since the power feed unit is disposed between the rotor-side elastic member and the interior surface of the upper wall portion of the case, a particular space capable of accommodating the power feed unit has to be provided between the rotor-side elastic member and the interior surface of the upper wall portion of the case, which leads to the problem that the size of the motor inevitably increases in the axial direction.

Furthermore, since the ultrasonic motor is configured so that the conductive brush contacts the conductive plate in rubbing fashion with the conductive brush fixed to the interior surface of the cover and the conductive plate to the rotor-side elastic member, the cover and the motor mechanism must be matched (aligned) against each other, but the task of matching is extremely difficult, resulting in the problem that the manufacturing increase.

On the other hand, for the traveling wave ultrasonic motor first described, a power feed method in which a rotary transformer or a combination of a slip ring and a brush is used is proposed as a method applicable to an ultrasonic motor where the piezoelectric element is attached to the rotor, not to the stator (Japanese Unexamined Patent Publication JP-A 4-71371 (1992)). However, the detailed configuration using the rotary transformer is not presented, though the configuration using the slip ring is described in detail therein.

DISCLOSURE OF INVENTION

An object of the present invention is to provide an ultrasonic motor capable of achieving stable power supply to a rotor side.

Another object of the invention is to provide an ultrasonic motor which realizes a compact motor construction, achieves reduction in manufacturing costs, and is capable of regulating the rotation of the rotor in a well controlled manner.

The present invention provides an ultrasonic motor comprising:

a stator-side elastic member having a rotationally symmetrical press-contact face;

a rotor-side elastic member having a rotationally symmetrical press-contact face facing the press-contact face of the stator-side elastic member, the rotor-side elastic member being supported so as to be angularly displaceable about a rotation symmetry axis;

a stator-side vibrating element for generating a rotational displacement wave of frequency Fs on the press-contact face of the stator-side elastic member;

a rotor-side vibrating element for generating a rotational displacement wave of frequency Fr on the press-contact face of the rotor-side elastic member, the rotor-side elastic member being angularly displaced at a rotational speed proportional to a frequency difference ΔF between the frequency Fs and the frequency Fr; and a rotary transformer for supplying drive power having a phase difference equivalent to N phases (N is an integer equal to or more than 2) to the rotor-side vibrating element which is angularly displaced together with the rotor-side elastic member, the rotary transformer including more than N transformer circuits concentrically arranged, N transformer circuits which are sequentially arranged inwardly from an outermost one being used as drive power transformer circuits.

According to the invention, by supplying power to the rotor-side vibrating element using the rotary transformer, power feed with reduced power loss and reduced mechanical loss can be achieved. Further, when driving the rotor-side vibrating element with N-phase drive power, the unbalance between each phase of the drive power can be minimized by supplying the drive power using the N transformer circuits starting from the outermost one out of the plurality of concentrically arranged transformer circuits. When the transformer circuits are arranged concentrically, the circumferential length of the core forming each transformer circuit varies according to the radius from the center of rotation, that is, as the core diameter decreases, the radius ratio between adjacent cores increases, increasing the difference in inductance between adjacent cores and thus increasing the difference in transformer transfer efficiency. On the other hand, the outer the transformer circuits are located, the smaller the unbalance between adjacent cores, and therefore, such transformer circuits are suitable for supplying N-phase drive power.

It is preferable that the rotary transformer is disposed on the rotation symmetry axis side with respect to the press-contact faces of the stator- and rotor-side elastic members, and in that case, since a sufficient space for accommodating the rotary transformer can be secured, not only the overall size of the motor can be reduced, but also a relatively large-sized rotary transformer can be used, thus making high-output, high-efficiency power feed possible. Especially, when each elastic member is formed in a ring shape, the space saving effect is further enhanced since the rotary transformer can be accommodated inside the ring.

The invention is also characterized in that an innermost one of the transformer circuits is used as a detection signal transformer circuit for transmitting a detection signal resulting from the detection of the rotational displacement wave generated on the press-contact face of the rotor-side elastic member.

According to the invention, since the detection signal resulting from the detection of the rotational displacement wave on the rotor-side elastic member is a single-phase signal, one transformer circuit should suffice for the signal transmission. Accordingly, even if, of the plurality of concentrically arranged transformer circuits, the innermost transformer circuit, which has large characteristic differences between adjacent cores is used for that purpose, the "unbalance" problem does not occur. This also allows the outer and more suitable transformer circuits to be used for other circuit systems where the balance is important.

The invention is also characterized in that the stator-side vibrating element and the rotor-side vibrating element, respectively, are rotationally symmetrical piezoelectric elements attached to surfaces of the stator-side and rotor-side elastic members, which surfaces are opposite to the press-contact faces thereof, first and second drive electrodes for two-phase driving and a monitor electrode for detecting a vibrating wave are formed on a surface of each of the piezoelectric elements, and the first and second drive electrodes are respectively connected to the drive power transformer circuits, and the monitor electrode is connected to the detection signal transformer circuit.

According to the invention, by using rotationally symmetrical piezoelectric elements as the stator- and rotor-side vibrating elements, a rotational displacement wave can be generated efficiently on the press-contact face of each of the stator- and rotor-side elastic members. The rotational displacement wave here is a surface wave created by a given point on the press-contact face elliptically moving within a plane containing the propagation direction of the wave and the direction of a plane normal. When there occurs a frequency difference between opposing points, a velocity difference occurs between the stator-side elastic member and the rotor-side elastic member, resulting in the generation of a torque for rotating the rotor-side elastic member.

Further, by forming the first and second drive electrodes for two-phase driving on the surface of each piezoelectric element, a rotational displacement wave can be generated along the circumference direction of the piezoelectric element, and by detecting the vibrating wave with the monitor electrode, feedback can be provided to the drive circuit for the piezoelectric element. Thus, the rotary transformer includes two drive power transformer circuits and one detection signal transformer circuit to provide independent power supplies and achieve signal transmission.

The invention is also characterized in that a non-magnetic material for suppressing magnetic coupling is interposed between a detection core forming the detection signal transformer circuit and a drive core forming the drive power transformer circuits.

According to the invention, by providing the non-magnetic material to suppress the magnetic coupling between the detection core and the drive core, crosstalk from the drive signal lines to the detection signal line of the piezoelectric element can be greatly reduced. Since the detection signal from the monitor electrode is used as a feedback signal to the drive circuit for the piezoelectric element, introduction of noise would cause an unstable condition in the drive circuit. Furthermore, since this detection signal is obtained using the piezoelectric effect, the resulting high impedance output is susceptible to noise. Therefore, by suppressing the magnetic coupling with the drive core which transmits large power, the S/N ratio of the detection signal transmitting in the detection core can be improved.

The present invention also provides an ultrasonic motor comprising:

a stator-side elastic member having a rotationally symmetrical press-contact face;

a rotor-side elastic member having a rotationally symmetrical press-contact face facing the press-contact face of the stator-side elastic member, the rotor-side elastic member being supported so as to be angularly displaceable about a rotation symmetry axis;

a rotor-side vibrating element for generating a rotational displacement wave on the press-contact face of the rotor-side elastic member, the rotor-side elastic member being angularly displaced by the rotational displacement wave; and a rotary transformer for supplying drive power having a phase difference equivalent to N phases (N is an integer equal to or more than 2) to the rotor-side vibrating element which is angularly displaced together with the rotor-side elastic member, the rotary transformer including more than N transformer circuits concentrically arranged, N transformer circuits of the more than N transformer circuits which are sequentially arranged inwardly from an outermost one being used as drive power transformer circuits.

According to the invention, by supplying power to the rotor-side vibrating element using the rotary transformer, power feed with reduced power loss and reduced mechanical loss can be achieved. Further, when driving the rotor-side vibrating element with N-phase drive power, the unbalance between each phase of the drive power can be minimized by supplying the drive power using the N transformer circuits starting from the outermost one out of the plurality of concentrically arranged transformer circuits. When the transformer circuits are arranged concentrically, the circumferential length of the core forming each transformer circuit varies according to the radius from the center of rotation, that is, as the core diameter decreases, the radius ratio between adjacent cores increases, increasing the difference in inductance between adjacent cores and thus increasing the difference in transformer transfer efficiency. On the other hand, the outer the transformer circuits are located, the smaller the unbalance between adjacent cores, and therefore, such transformer circuits are suitable for supplying N-phase drive power.

The present invention further provides an ultrasonic motor comprising:
   a stator-side elastic member having a rotationally symmetrical press-contact face;
   a rotor-side elastic member having a rotationally symmetrical press-contact face facing the press-contact face of the stator-side elastic member, the rotor-side elastic member being supported so as to be angularly displaceable about a rotation symmetry axis;
   a stator-side vibrating element for generating a rotational displacement wave of frequency Fs on the press-contact face of the stator-side elastic member;
   a rotor-side vibrating element for generating a rotational displacement wave of frequency Fr on the press-contact face of the rotor-side elastic member, the rotor-side elastic member being angularly displaced at a rotational speed proportional to a frequency difference ΔE between the frequency Fs and the frequency Fr; and
   a rotary transformer, disposed on the rotation symmetry axis side with respect to the press-contact faces of the stator- and rotor-side elastic members, for supplying power to the rotor-side vibrating element which is angularly displaced together with the rotor-side elastic member,
   a step-up ratio Nr of the rotary transformer being larger than 1.

According to the invention, by supplying power to the rotor-side vibrating element using the rotary transformer, power feed with reduced power loss and reduced mechanical loss can be achieved. Further, by mounting the rotary transformer on the rotation symmetry axis side with respect to the press-contact faces of the stator- and rotor-side elastic members, the overall size of the motor can be reduced since a sufficient space for accommodating the rotary transformer can be secured. Since this also allows the use of a relatively large-sized rotary transformer, high-output, high-efficiency power feed can be achieved. Especially, when each elastic member is formed in a ring shape, the space saving effect is further enhanced since the rotary transformer can be accommodated inside the ring.

When piezoelectric elements are used as the stator- and rotor-side vibrating elements, relatively high drive voltages must be supplied; therefore, when a rotary transformer having a step-up ratio Nr larger than 1 is used, the rotary transformer can be made to also function as a step-up transformer. As a result, while it was common to use a step-up fixed transformer in conventional traveling wave ultrasonic motors, in the present invention the rotary transformer can be used as a substitute for the fixed transformer for the rotor-side vibrating element; this serves to reduce the number of components.

The invention is also characterized in that the ultrasonic motor further comprises a fixed transformer for supplying power to the stator-side vibrating element and a ratio Nr/Ns between the step-up ratio Nr of the rotary transformer and the step-up ratio Ns of the fixed transformer satisfies a relation of $0.5 \leq Nr/Ns \leq 2$.

According to the invention, by setting the ratio Nr/Ns between the step-up ratio Nr of the rotary transformer and the step-up ratio Ns of the fixed transformer within the range of 0.5 to 2, the unbalance of the supply power or drive voltages to the stator- and rotor-side vibrating elements can be eliminated.

When identical drive circuits are used for both the stator-side vibrating element and the rotor-side vibrating element, it is preferable that the step-up ratios Nr and Ns of the respective circuits are made substantially the same, and in that case, the operation of the stator-side vibrating element can be made to substantially match that of the rotor-side vibrating element.

The present invention also provides an ultrasonic motor comprising:
   a stator-side elastic member having a rotationally symmetrical press-contact face;
   a rotor-side elastic member having a rotationally symmetrical press-contact face facing the press-contact face of the stator-side elastic member, the rotor-side elastic member being supported so as to be angularly displaceable about a rotation symmetry axis;
   a rotor-side vibrating element for generating a rotational displacement wave on the press-contact face of the rotor-side elastic member, the rotor-side elastic member being angularly displaced by the rotational displacement wave; and
   a rotary transformer for supplying power to the rotor-side vibrating element which is angularly displaced together with the rotor-side elastic member,
   a step-up ratio Nr of the rotary transformer being larger than 1.

According to the invention, by supplying power to the rotor-side vibrating element using the rotary transformer, power feed with reduced power loss and reduced mechanical loss can be achieved. Further, it is preferable that the rotary transformer is disposed on the rotation symmetry axis side with respect to the press-contact faces of the stator- and rotor-side elastic members; by so arranging, the overall size of the motor can be reduced since a sufficient space for accommodating the rotary transformer can be secured. Since this also allows the use of a relatively large-sized rotary transformer, high-output, high-efficiency power feed can be achieved. Especially, when each elastic member is formed in a ring shape, the space saving effect is further enhanced since the rotary transformer can be accommodated inside the ring.

When a piezoelectric element is used as the stator-side vibrating element, a relatively high drive voltage must be supplied; therefore, when a rotary transformer having a step-up ratio Nr larger than 1 is used, the rotary transformer can be made to also function as a step-up transformer. As a result, while it was common to use a step-up fixed transformer in conventional traveling wave ultrasonic motors, in the present invention the rotary transformer can be used as a substitute for the fixed transformer for the rotor-side vibrating element; this serves to reduce the number of components.

The invention further provides an ultrasonic motor comprising a stator having a stator-side elastic member and a stator-side vibrator attached to the stator-side elastic member; and a rotor having a rotor-side elastic member facing and pressed against the stator-side elastic member and a rotor-side vibrator attached to the rotor-side elastic member, the vibrators being caused to vibrate by supplying signals of prescribed frequency to the respective vibrators, the rotor being driven by means of traveling waves generated on the press-contact faces of the respective elastic members by the vibrations, wherein the stator-side elastic member and the rotor-side elastic members are respectively provided with recessed portions opposing each other and are formed into substantially the same shape, and a power feed unit for supplying the signal of the prescribed frequency to the rotor-side vibrator is disposed within a space formed between the opposing recessed portions.

According to the invention, since the two elastic members are made substantially identical in shape, the stator and rotor can be constructed to have the same natural frequency of vibration. Accordingly, when signals whose frequencies are equal to or nearly equal to the resonant frequency of the stator and rotor are supplied to the respective vibrators, the traveling waves generated on the press contact faces of the elastic members lock (engage) with each other, just as gears engage with each other, and the rotor is held in the stopped condition; when the phase of one signal is shifted in the positive or negative direction with respect to the phase of the other signal, the engagement lock position shifts in the forward or backward direction, and by repeating this shift operation, the rotor is caused to rotate in the forward or backward direction. That is, when the two elastic members are formed in substantially the same shape, the rotation of the rotor can be regulated in a well controlled manner.

Further, since the space formed between the opposing recessed portions of the elastic members is utilized to accommodate the power feed unit for supplying the signal of the prescribed frequency to the rotor-side vibrator, there is no need to particularly provide a space for accommodating the power feed unit along the axial direction of the motor, and the size of the motor can thus be reduced in the axial direction compared with the prior art. Furthermore, since this also eliminates the need for the matching between the cover and the motor mechanism, which is difficult to achieve, the manufacturing costs can be reduced. Moreover, since the same components can be used between the respective elastic members, their costs can be reduced.

A variety of configurations are possible for the power feed unit, for example, a rotary transformer may be employed.

It is also possible to employ as the power feed unit a brush contact power feed unit comprising a conductive brush attached to either the stator or rotor side and a conductors provided at the other side, for contacting the conductive brushes in rubbing fashion.

BRIEF DESCRIPTION OF DRAWINGS

FIGS. 2A and 2B are exploded perspective views illustrating an assembly procedure;

FIGS. 3A and 3B are exploded perspective views illustrating an assembly procedure;

FIGS. 6A–6G are graphs showing how a traveling wave is generated: FIG. 6A is a diagram showing the piezoelectric element 31 expanded in a straight line form, FIG. 6G is a diagram showing voltage waveforms applied to drive electrodes 31a and 31b, and FIGS. 6B to 6F are diagrams showing the waveforms of the traveling wave at times t0 to t4 in FIG. 6G, respectively;

BEST MODE FOR CARRYING OUT THE INVENTION

Figure 1A:
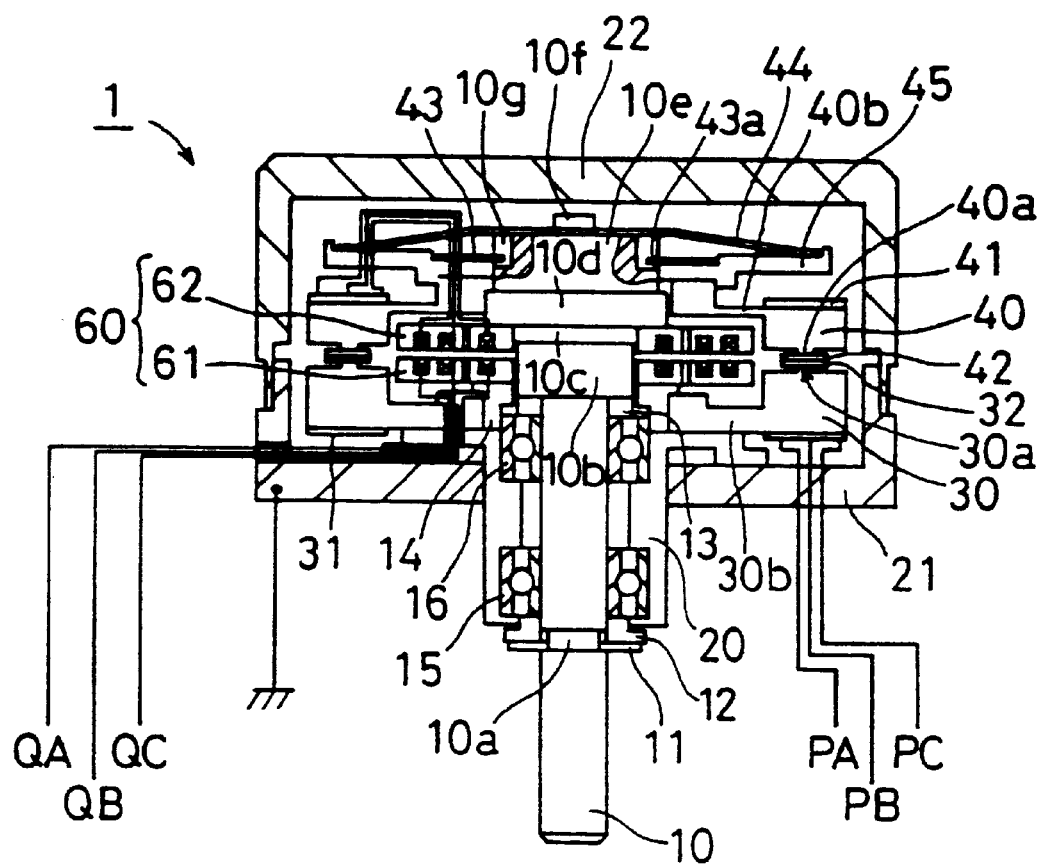
FIG. 1A is a cross sectional view showing the construction of one embodiment according to the present invention.

Preferred embodiments of an ultrasonic motor according to the present invention will be described below with reference to the accompanying drawings. Throughout the drawings, like elements or elements identical in function are designated by like reference numerals, and the description of such elements, once given, will not be repeated thereafter.

Figure 1B:
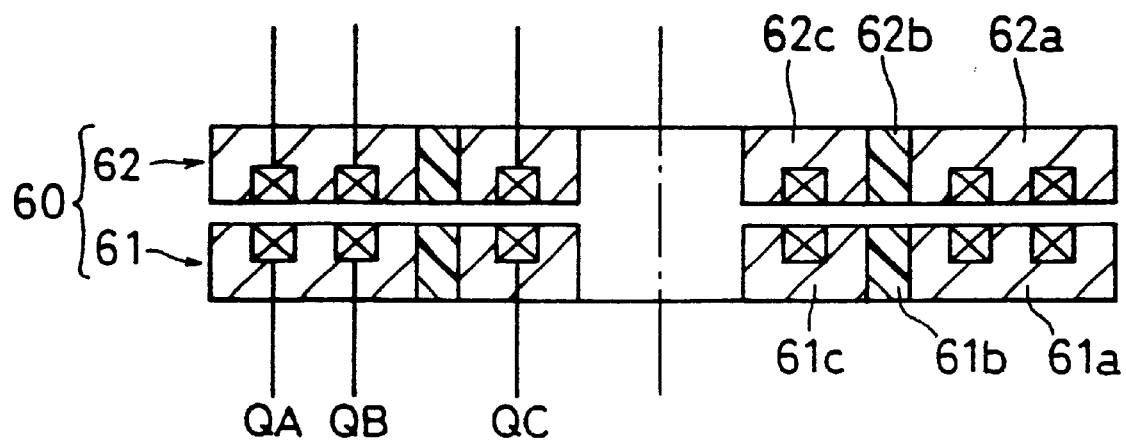
FIG. 1B is an enlarged cross sectional view of a rotary transformer 60 in FIG. 1A.
Figure 4:
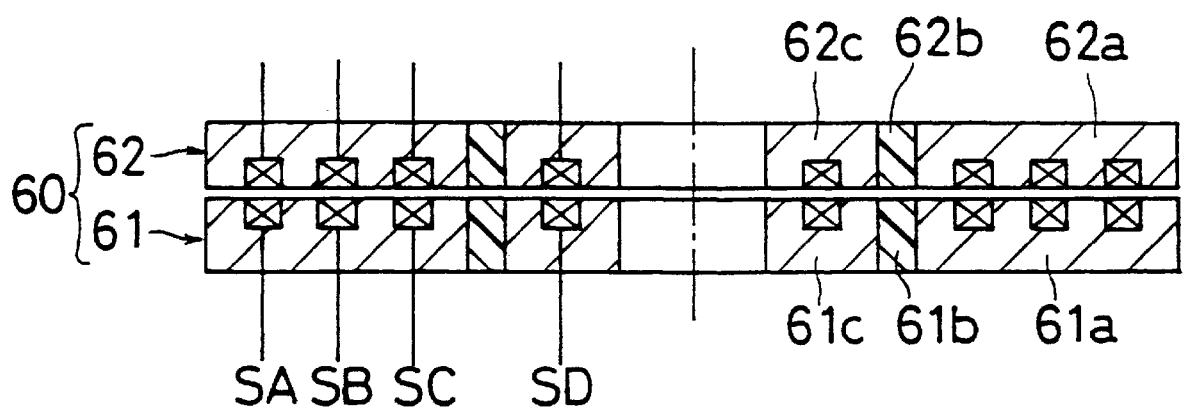
FIG. 4 is an enlarged cross sectional view of the rotary transformer 60 shown in FIGS. 2 and 3.

FIG. 1A is a cross sectional view showing the construction of one embodiment according to the present invention, and FIG. 1B is an enlarged cross sectional view of a rotary transformer 60 in FIG. 1A. FIGS. 2 and 3 are exploded perspective views illustrating assembly procedures, and FIG. 4 is an enlarged cross sectional view of the rotary transformer 60 in FIGS. 2 and 3.

An ultrasonic motor 1 comprises a stator-side elastic member 30 having a rotationally symmetrical shape, a rotor-side elastic member 40 having a rotationally symmetrical shape, a stator-side piezoelectric member 31 for imparting vibrations to the elastic member 30, a rotor-side piezoelectric member 41 for imparting vibrations to the elastic member 40, an output shaft 10 rotating integrally with the elastic member 40, the rotary transformer 60 for supplying power to the piezoelectric element 41 in non-contacting fashion, and housings 21 and 22 for accommodating therein the above-enumerated elements.

The housing 21 is shaped into a cylindrical box consisting of a bottom and an encircling side wall, in the center of which bottom a through hole is formed, and a hollow bearing holder 20 having a T-shaped cross section is fitted into the through hole. Steps are formed in the upper and lower sections of the interior surface of the bearing holder 20, and bearings 15 and 16 for rotatably supporting the output shaft 10 are fixedly disposed on the respective steps, one being spaced apart from the other by a predetermined distance.

The output shaft 10 is inserted so that the inner rings of the bearings 15 and 16 substantially fit around the output shaft 10. The bearing 16 is held in position by abutting against a spacer 13 disposed on the step face of a thick shaft portion 10b in the center of the output shaft 10, while the bearing 15 is held in position by a spacer 12 fitted onto the output shaft 10 from one end thereof, around which output shaft a circumferential groove 10a is formed in which a stopper 11 such as an E-ring is fitted to support the output shaft 10 integrally with the inner rings of the bearings 15 and 16.

The elastic member 30 is disposed on the upper surface of the bearing holder 20, and is centered by being held in substantial engagement with the outer periphery of the bearing 16.

The elastic member 30 comprises a thick wall portion having on an upper surface thereof an annular press-contact face 30a, a thin wall portion 30b supporting the thick wall portion from inside, and a mounting portion substantially fitted on an inner spacer 14, and is configured so as to allow the thick wall portion to vibrate in its thickness direction. The piezoelectric element 31 which has an annular disc shape is bonded to the lower surface of the thick wall portion opposite the press-contact face 30a. The press-contact face 30a has a protruding cross section so that the vibrations produced in the piezoelectric element 31 can be efficiently concentrated at the protrusion, and a liner 32 formed of a low friction material such as a fluororesin is fixed to the upper surface of the protrusion.

Similarly to the elastic member 30, the rotor-side elastic member 40 comprises a thick wall portion having on a lower surface thereof an annular press-contact face 40a, a thin wall portion 40b supporting the thick wall portion from inside, and a mounting portion for transmitting a torque to the output shaft 10, and is configured so as to allow the thick wall portion to vibrate in its thickness direction. The piezoelectric element 41 which has an annular disc shape is rigidly bonded to the upper surface of the thick wall portion opposite the press-contact face 40a. The press-contact face 40a has a protruding cross section so that the vibrations produced in the piezoelectric element 41 can be efficiently concentrated at the protrusion, and a liner 42 formed of a low friction material such as a fluororesin is fixed to the lower surface of the protrusion.

Preferably, the elastic members 30 and 40 are formed of a material having a low damping force, for example, a metal such as iron or brass.

An annular disc shaped spring receiving plate 45 is disposed on the mounting portion of the elastic member 40. Centering is achieved with the inside of the spring receiving plate 45 substantially engaging with a stepped portion 10d of the output shaft 10. An engaging plate 43 having two protrusions 43a is disposed on the inner portion of the upper surface of the spring receiving plate 45. With the protrusions 43a engaging with notches 10g cut in a base end portion 10e of the output shaft 10, the torque rotating the elastic member 40 is transmitted to the output shaft 10.

A plate spring 44 is attached to the base end face of the output shaft 10, and centering is achieved with the through hole formed in the center of the plate spring 44 substantially engaging on the protrusion 10f formed at the center of the base end of the output shaft 10.

The plate spring 44 comprises a center disc and a plurality of radially extending swinging ends, and the force for pressing the elastic members 30 and 40 together is generated with the swinging ends applying uniform pressure to the spring receiving plate 45.

The rotary transformer 60 is disposed within a ring-shaped space provided inwardly of the thick wall portions of the annular elastic members 30 and 40 and between the thin wall portion/mounting portion sections of the elastic members 30 and 40.

The rotary transformer 60 comprises an annular stator-side core 61 and an annular rotor-side core 62 disposed opposite each other with a prescribed gap provided therebetween. The stator-side core 61 is disposed on the annular spacer 14. The rotor-side core 62 is disposed on the step face of the stepped portion 10d and substantially fitted around a thick shaft portion 10c whose diameter is slightly larger than that of the thick shaft portion 10b of the output shaft 10, so that the core 62 rotates integrally with the output shaft 10.

Figure 5B:
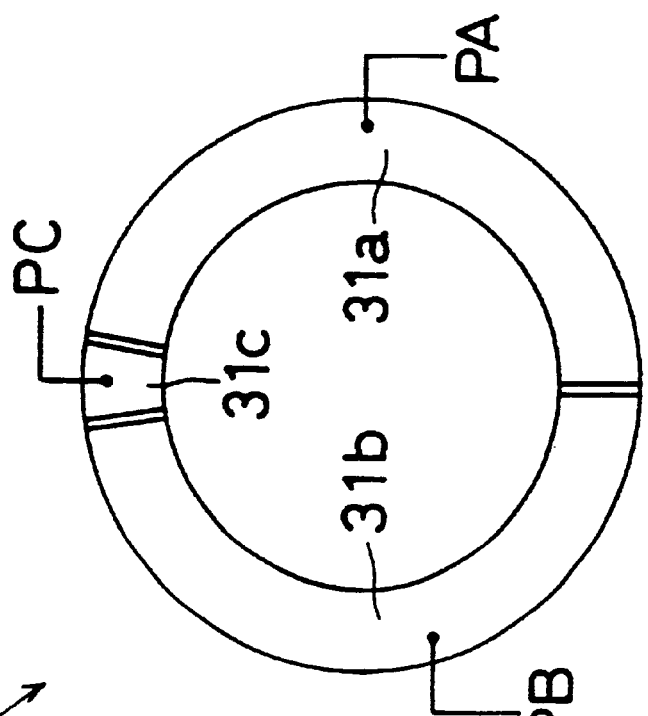
FIG. 5B is a plan view showing the electrode configuration of the piezoelectric element 31.
Figure 5A:
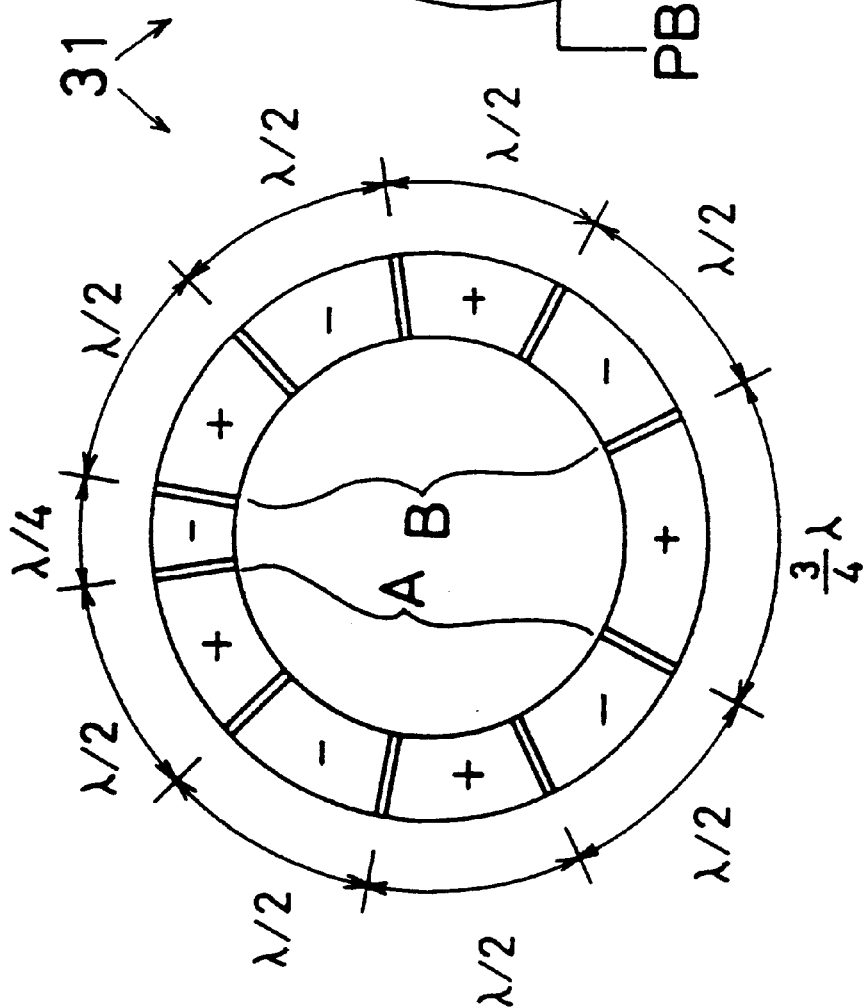
FIG. 5A is a plan view showing the polarization state of a piezoelectric element 31.

Next, an electrical system will be described. FIG. 5A is a plan view showing the polarization state and electrode configuration of the piezoelectric element 31, and FIG. 5B is a plan view showing the electrode configuration on the side of the piezoelectric element 31 opposite from the side thereof shown in FIG. 5A. The piezoelectric element 41 has the same polarization state and electrode configuration as the piezoelectric element 31.

When a driving electric field is applied in the thickness direction, the annular piezoelectric element 31 expands and contracts in the thickness and circumference directions, and produces vibrations with the expand/contract motions rapidly alternating, and a rotational displacement wave such as a traveling wave or standing wave is created by changing the phase of the vibration along the circumference direction. In the figures is shown the case where a 5-period displacement wave is generated around the circumference, and as shown in FIG. 5A, there are formed two groups A and B, each consisting of four $\lambda/2$ polarization regions alternately polarized in opposite directions for every $\lambda/2$, and a $\lambda/4$ polarization region and a $3\lambda/4$ polarization region are respectively interposed between the groups A and B, where $\lambda$ is the wavelength of the displacement wave. For the thus arranged polarization regions and electrodes, a drive electrode 31a, a drive electrode 31b, and a monitor electrode 31c are formed corresponding to the group A, the group B, and the $\lambda/4$ polarization region, respectively. Here, the elastic member 30 on which the piezoelectric element 31 is disposed functions as an annular common electrode facing the electrodes A, B, $\lambda/4$, and $3\lambda/4$, and the elastic member 30 is grounded via the housing 21. Likewise, the elastic member 40 functions as a common electrode for the piezoelectric element 41, and is grounded via the housing 21.

When an electric field is applied across the thickness of the piezoelectric element 31 (for example, perpendicular to the plane of the figure and into the plane), the piezoelectric element 31 expands and contracts in the thickness and circumference directions due to the electrostrictive effect, in the positive polarization regions marked with "+", the thickness increases, while in the negative polarization regions marked with "−", the thickness decreases. For example, when a positive voltage is applied to the drive electrode 31a corresponding to the group A, the displacement direction changes every $\lambda/2$, and a wave for two wavelengths is created with nodes of the wave formed at boundaries between the respective polarization regions. When the applied voltage to the drive electrode 31a is varied at a frequency in the ultrasonic frequency range, the wave generated from the group A propagates through the entire piezoelectric element 31. Likewise, when an AC voltage in the ultrasonic frequency range is applied to the drive electrode 31b corresponding to the group B, a wave for two wavelengths propagates through the entire piezoelectric element 31, and thus the wave from the group A and the wave from the group B are superimposed one on top of the other. Accordingly, by applying a cosine wave to the drive electrode 31a and a sine wave to the drive electrode 31b with their phases shifted 90 degrees relative to each other, a traveling wave propagating in a given direction can be generated.

FIG. 6 is a graph showing how the traveling wave is generated. FIG. 6A is a diagram showing the piezoelectric element 31 expanded in a straight line form, and FIG. 6G shows voltage waveforms applied to the drive electrodes 31a and 31b. FIGS. 6B to 6F show the waveforms of the traveling wave at times t0 to t4 in FIG. 6G. At time t0, only the group A is generating a surface wave of amplitude 1, which propagates through the entire ring. At time t1, the groups A and B are generating surface waves of amplitude $1/\sqrt{2}$, 90 degrees apart in phase, and the sum wave is shifted to the left by $\lambda/8$ compared with the waveform at time t0. At time t2, only the group B is generating a surface wave of amplitude 1, which is shifted to the left by $\lambda/8$ compared with the wave format time t1. Similarly, at times t3 and t4, the wave is shifted to the left by $\lambda/8$ each time, and it is thus shown that the traveling wave moving to the left with time is generated.

Conversely, when a sine wave is applied to the drive electrode 31a and a cosine wave to the drive electrode 31b with their phases shifted 90 degrees in the opposite direction, a traveling wave moving in the direction opposite to that described above can be generated. In this way, by driving the respective electrodes by relating the spatial phase difference between the groups A and B to the temporal phase difference between the respective drive waveforms, a traveling wave moving in the desired direction can be generated. Since the piezoelectric element 31 is rigidly bonded to the elastic member 30, the expand/contract motions of the piezoelectric element 31 are translated into a wave having a prescribed amplitude. Then, the two waves differing in phase are summed together to create a traveling wave, and this traveling wave is transmitted through the elastic member 30, generating a traveling wave on the press-contact face 30a. Similarly, the traveling wave created by the expand/contract motions of the piezoelectric element 41 is transmitted through the elastic member 40, generating a traveling wave on the press-contact face 40a.

The vibrating waveform of the traveling wave generated in the piezoelectric element 31 due to the piezoelectric effect is detected as an electrical signal by the monitor electrode 31c. The drive electrodes 31a and 31b and the monitor electrode 31c are connected to lines PA, PB, and PC, respectively, which are leaded out through a lead-out hole formed in the housing 21.

In the case of the piezoelectric element 41 also, the drive electrodes 41a and 41b and the monitor electrode 41c are connected to lines QA, QB, and QC, respectively, in this case via the rotary transformer 60.

FIG. 1 shows an example in which the rotary transformer 60 is configured as a two-phase drive transformer and includes three transformer circuits corresponding to the lines QA, QB, and QC. As shown in FIG. 1B, five annular protrusions are formed in concentric fashion on each of the stator-side core 61 and the rotor-side core 62, of which protrusions, outer three protrusions function as drive-side cores 61a and 62a forming the transformer circuits for the lines QA and QB, and inner two protrusions function as detection-side cores 61c and 62c forming the transformer circuit for the line QC. Each annular protrusion is provided with grooves spaced apart from one another by a prescribed angle, thus forming a plurality of sub protrusions, and a coil is disposed so as to be wound around each sub protrusion, and in this arrangement, power feed and signal transmission are accomplished in non-contacting fashion by the magnetic coupling between the opposing annular protrusions.

Further, the drive-side core 61a, 62a and the detection-side core 61c, 62c may be separated by inserting therebetween a separator 61b, 62b formed of a non-magnetic material such as a plastic material in order to suppress magnetic coupling between the respective cores. Such separators 61b, 62b may be inserted not only between the drive-side core 61a, 62a and the detection-side core 61c, 62c, but also between the respective lines QA, QB, and QC. By providing such non-magnetic separators 61b, 62b, magnetic coupling between the respective transformer circuits can be suppressed. The separators 61b, 62b may be formed by filling adhesive material.

On the other hand, FIGS. 2 to 4 show an example in which the rotary transformer 60 is configured as a three-phase drive transformer and includes four transformer circuits corresponding to lines SA, SB, SC, and SD. As shown in FIG. 4, six annular protrusions are formed in concentric fashion on each of the stator-side core 61 and the rotor-side core 62, of which protrusions, outer four protrusions function as the drive-side cores 61a and 62a forming the transformer circuits for the lines SA, SB, and SC, and inner two protrusions function as the detection-side cores 61c and 62c forming the transformer circuit for the line SD. Each annular protrusion is provided with grooves spaced part from one another by a prescribed angle, thus forming a plurality of sub protrusions, and a coil is disposed so as to be wound around each sub protrusion, and in this arrangement, power feed and signal transmission are accomplished in non-contacting fashion by the magnetic coupling between the opposing annular protrusions.

Further, the drive-side core 61a, 62a and the detection-side core 61c, 62c may be separated by inserting therebetween a separator 61b, 62b formed of a non-magnetic material such as a plastic material in order to suppress magnetic coupling between the respective cores.

Figure 7:
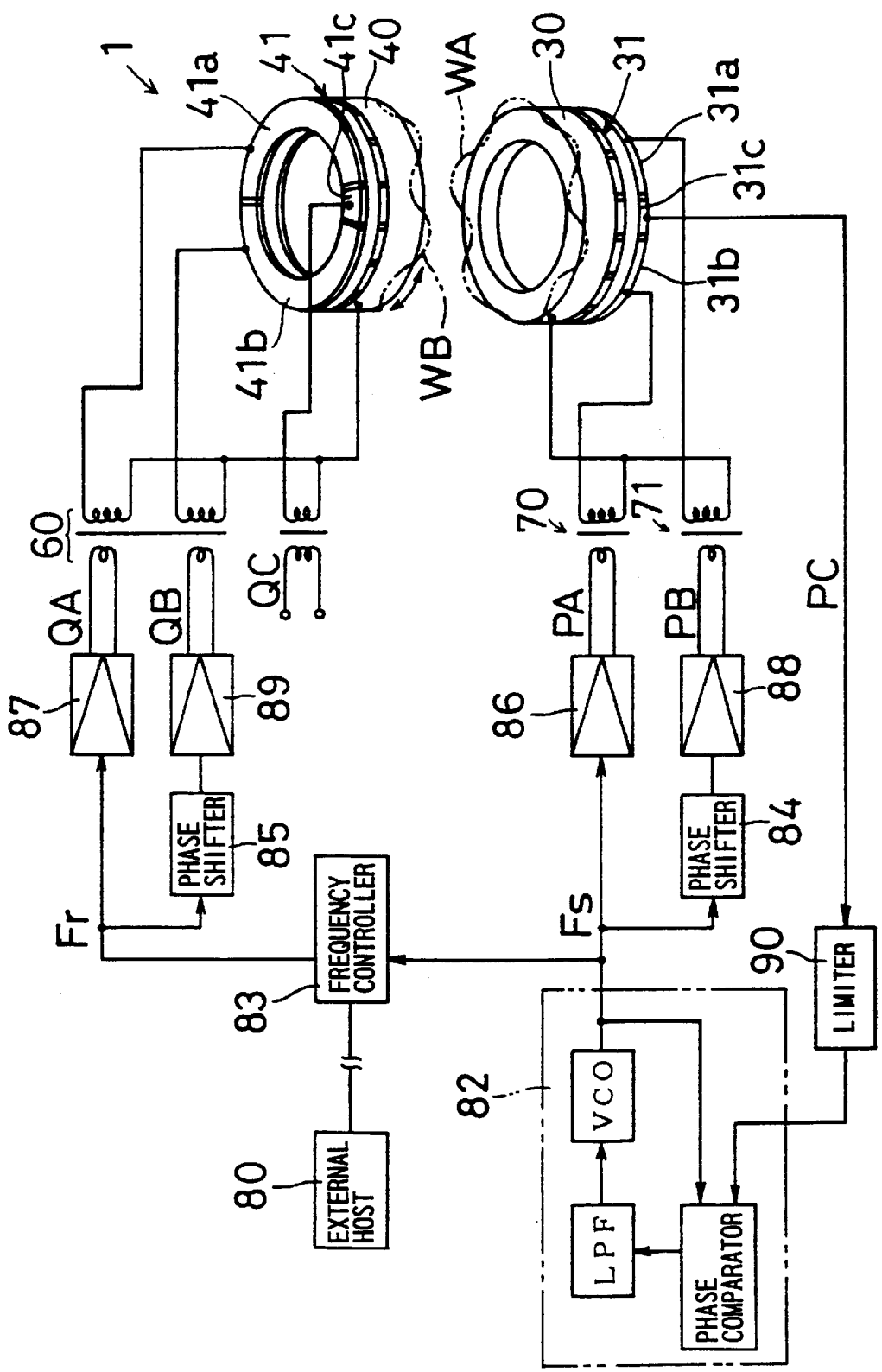
FIG. 7 is a block diagram showing one example of a drive control circuit for an ultrasonic motor.

FIG. 7 is a block diagram showing one example of a drive control circuit for the ultrasonic motor. In this circuit example, the stator is constructed as the main drive part and the rotor as the driven part. The elastic members 30 and 40 in the ultrasonic motor 1 are pressed together into contact with each other and, in this condition, are electrically grounded via the output shaft 10, the housing 21, etc. The drive electrodes 31a, 31b and monitor electrode 31c of the piezoelectric element 31 attached to the stator-side elastic member 30 are connected to the lines PA, PB, and PC, respectively. Step-up transformers 70 and 71 for generating high voltages necessary for piezoelectric driving are inserted between the lines PA, PB and the corresponding electrodes. Here, the step-up transformers 70 and 71 are fixed to a circuit board or the like.

The drive electrodes 41a, 41b and monitor electrode 41c of the piezoelectric element 41 attached to the rotor-side elastic member 40 are connected to the lines QA, QB, and QC, respectively, with the rotary transformer 60 interposed therebetween. When the step-up ratio Nr of the rotary transformer 60 is set to 1 or lower, a step-up transformer for generating a high voltage for piezoelectric driving has to be provided separately, but by setting the step-up ratio Nr of the rotary transformer 60 larger than 1, the step-up transformer at the rotor side can be omitted because the rotary transformer 60 can serve the same function as the step-up transformers 70 and 71.

Further, it is preferable that the electrical and mechanical characteristics are made substantially the same between the stator side and the rotor side so that the elastic members 30 and 40 will generate traveling waves of equal amplitudes, and the unbalance can be eliminated when the ratio Nr/Ns between the step-up ratio Nr of the rotary transformer 60 and the step-up ratio Ns of the step-up transformers 70, 71 is within the range of $0.5 \leq Nr/Ns \leq 2$, and more preferably Ns≈Nr.

A frequency control oscillator 82 at the stator side outputs an ultrasonic drive signal of frequency Fs (for example, a sine wave or a pulse wave) which, after being amplified by an amplifier 86, is output on the line PA and converted by the step-up transformer 70 into a high voltage, which is applied to the drive electrode 31b of the piezoelectric element 31. The ultrasonic drive signal from the frequency control oscillator 82 is also supplied to an amplifier 88 via a phase shifter 84 which shifts the phase by 90 degrees, and the signal amplified by the amplifier 88 is output on the line PB and converted by the step-up transformer 71 into a high voltage, which is applied to the drive electrode 31a of the piezoelectric element 31.

A detection signal generated at the monitor electrode 31c of the piezoelectric element 31 is input to a wave shaping limiter circuit 90 via the line PC, and returned as a feedback signal to the frequency control oscillator 82. The frequency control oscillator 82 is constructed, for example, from a PLL (Phase Locked Loop) circuit comprising a VCO (voltage controlled oscillator), a phase comparator, and an LPF (low pass filter), and operates in self-driving fashion.

At the rotor side, based on the ultrasonic drive signal of frequency Fs output from the frequency control oscillator 82, a frequency control circuit 83 outputs an ultrasonic drive signal of frequency Fr (for example, a sine wave or a pulse wave) which, after being amplified by an amplifier 87, is output on the line QA and converted by the rotary transformer 60 into a high voltage, which is applied to the drive electrode 41a of the piezoelectric element 41. The ultrasonic drive signal from the frequency control circuit 83 is also supplied to an amplifier 89 via a phase shifter 85 which shifts the phase by 90 degrees, and the signal amplified by the amplifier 89 is output on the line QB and converted by the rotary transformer 60 into a high voltage, which is applied to the drive electrode 41b of the piezoelectric element 41.

A detection signal generated at the monitor electrode 41c of the piezoelectric element 41 is not used when the rotor side is the driven side. To detect an angular error between the rotor and stator, the feedback signals at the rotor and stator sides are used to detect the phase difference between the signals.

When a command is input from an external host device 80 such as a computer, the frequency control circuit 83 interprets the command and controls the frequency Fr based on the frequency Fs from the frequency control oscillator 82.

For example, when the command from the external host device 80 is a rotational speed command, the frequency Fr is controlled by adding a frequency difference ΔF corresponding to the commanded rotational speed to the signal from the oscillator 82 so that the frequency difference ΔF is maintained. Then, the piezoelectric elements 31 and 41 generate vibrations of frequencies Fs and Fr, respectively, as described above, and these vibrations propagate through the respective elastic members 30 and 40, generating on the respective press-contact faces 30a and 40a rotational displacement waves WA and WB having displacement components along the circumference direction. Since the rotational displacement waves WA and WB on the press-contact faces 30a and 40a are shifted in frequency by an amount equal to the frequency difference ΔF, the rotor-side elastic member 40 rotates relative to the stator-side elastic member 30, and the thus generated rotational torque is taken from the output shaft 10 shown in FIG. 1. Since the rotational speed of the elastic member 40 varies in proportion to the frequency difference ΔF, the rotational speed of the ultrasonic motor 1 can be controlled with high precision by precisely controlling the frequency difference ΔF by means of the frequency control circuit 83.

Furthermore, when the frequency difference ΔF relative to the frequency Fs is reduced to zero by controlling the frequency Fr, the ultrasonic motor 1 comes to rest, with the pressing force between the elastic members 30 and 40 acting as the motor holding torque, thus eliminating the need for a brake mechanism.

When the command from the external host device 80 is a rotation angle command, the prescribed rotational speed corresponding to the frequency difference ΔF is maintained for a time corresponding to the rotation angle command, and upon the expiration of the time, the motor is caused to stop by controlling the frequency Fr so as to match the frequency Fs. Accordingly, rotation angle control like a stepping motor can also be accomplished.

In this way, by receiving the signal from the oscillator 82 and by controlling the frequency Fr appropriately, the frequency control circuit 83 can control the rotational speed, rotation angle, rotational direction, etc. of the ultrasonic motor 1 as desired.

Figure 8:
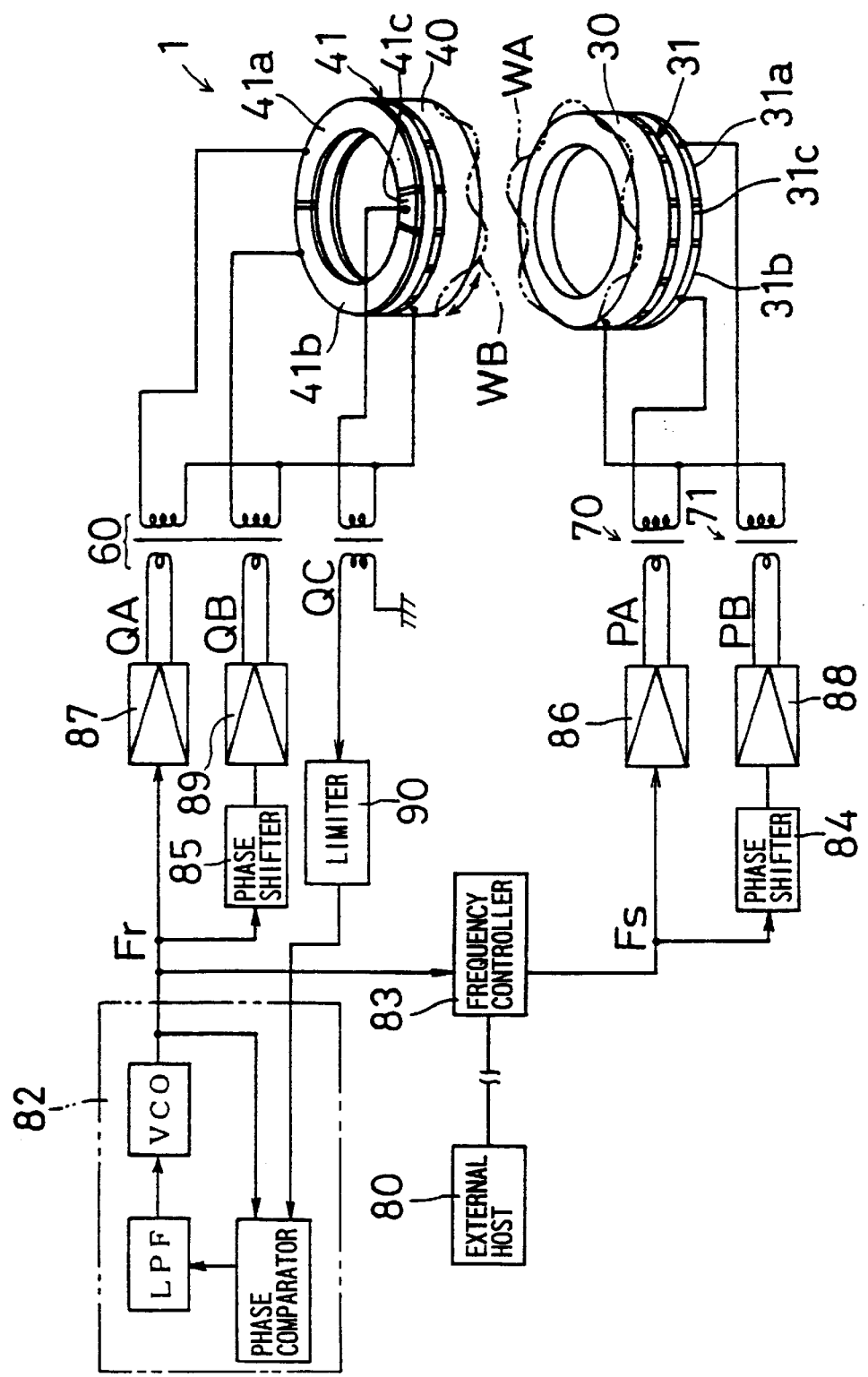
FIG. 8 is a block diagram showing another example of a drive control circuit for an ultrasonic motor.

FIG. 8 is a block diagram showing another example of a drive control circuit for the ultrasonic motor. In this circuit example, the rotor is constructed as the main drive part and the stator as the driven part.

The frequency control oscillator 82 outputs an ultrasonic drive signal of frequency Fr (for example, a sine wave or a pulse wave) which, after being amplified by the amplifier 87, is output on the line QA and converted by the rotary transformer 60 into a high voltage, which is applied to the drive electrode 41a of the piezoelectric element 41. The ultrasonic drive signal from the frequency control oscillator 82 is also supplied to the amplifier 89 via the phase shifter 85 which shifts the phase by 90 degrees, and the signal amplified by the amplifier 89 is output on the line QB and converted by the rotary transformer 60 into a high voltage, which is applied to the drive electrode 41b of the piezoelectric element 41.

The detection signal generated at the monitor electrode 41c of the piezoelectric element 41 is input to the wave shaping limiter circuit 90 via the line QC, and returned as a feedback signal to the frequency control oscillator 82. The frequency control oscillator 82 is constructed, for example, from a PLL (Phase Locked Loop) circuit comprising a VCO (voltage controlled oscillator), a phase comparator, and an LPF (low pass filter), and operates in self-driving fashion.

At the stator side, based on the ultrasonic drive signal of frequency Fr output from the frequency control oscillator 82, the frequency control circuit 83 outputs an ultrasonic drive signal of frequency Fs (for example, a sine wave or a pulse wave) which, after being amplified by the amplifier 86, is output on the line PA and converted by the step-up transformer 70 into a high voltage, which is applied to the drive electrode 31b of the piezoelectric element 31. The ultrasonic drive signal from the frequency control circuit 83 is also supplied to the amplifier 88 via the phase shifter 84 which shifts the phase by 90 degrees, and the signal amplified by the amplifier 88 is output on the line PB and converted by the step-up transformer 71 into a high voltage, which is applied to the drive electrode 31a of the piezoelectric element 31.

The detection signal generated at the monitor electrode 31c of the piezoelectric element 31 is not used when the stator is the driven side. To detect an angular error between the rotor and stator, the feedback signals at the rotor and stator sides are used to detect the phase difference between the signals.

When a command is input from the external host device 80 such as a computer, the frequency control circuit 83 interprets the command and controls the frequency Fs based on the frequency Fr from the frequency control oscillator 82. In this way, the rotational speed, rotation angle, and rotational direction, etc. of the ultrasonic motor 1 can be controlled as desired in accordance with the command input from the external host device 80.

Figure 9:
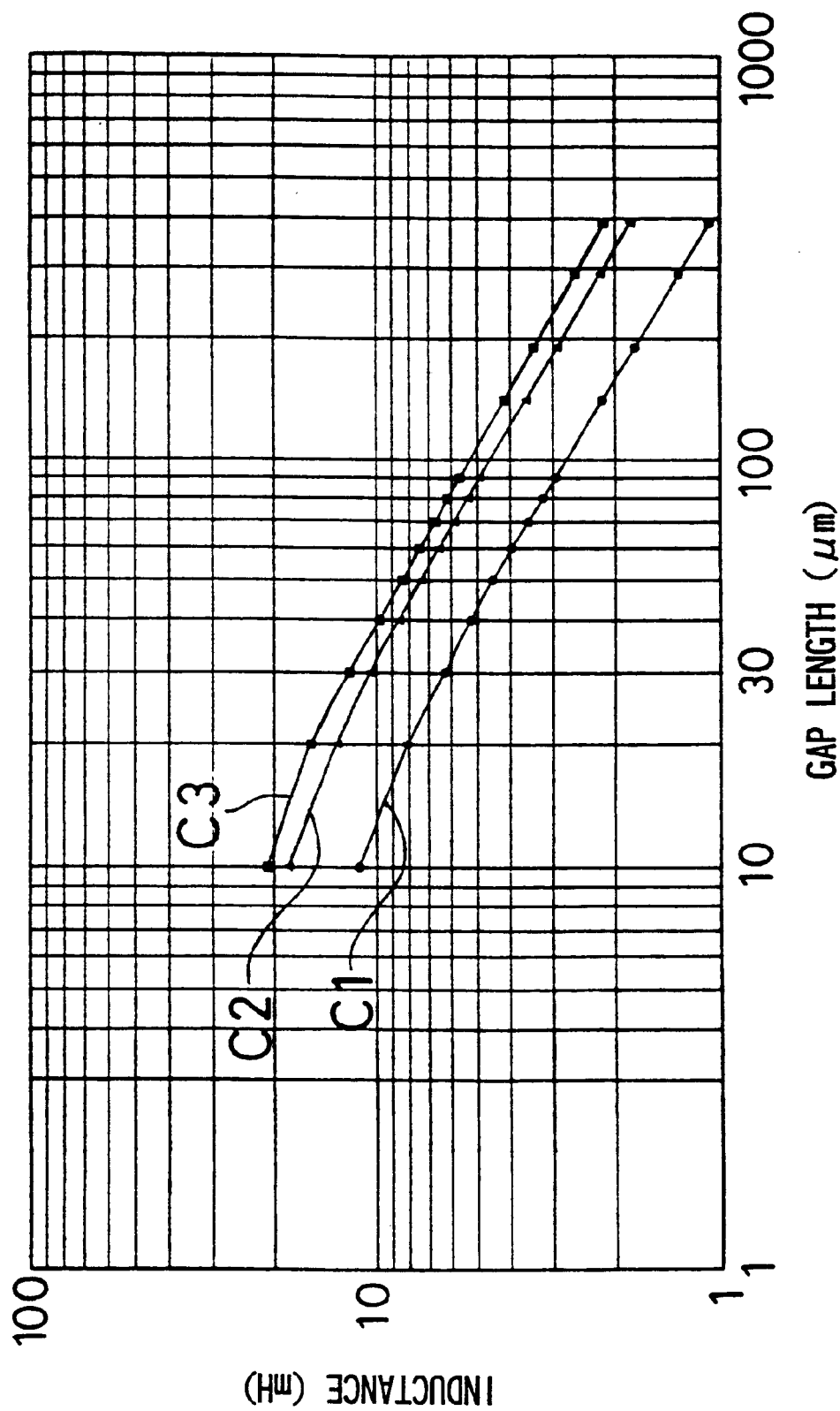
FIG. 9 is a graph showing the inductance characteristics of the rotary transformer 60.

FIG. 9 is a graph showing the inductance characteristics of the rotary transformer 60. The vertical axis represents in logarithmic form the inductance (mH) (the composition of self-inductance and mutual inductance) of the innermost transformer circuit C1, middle transformer circuit C2, and outermost transformer circuit C3 of the rotary transformer 60. The horizontal axis represents in logarithmic form the gap length ($\mu$m) between the stator-side core 61 and rotor-side core 62 of the rotary transformer 60. Here, the number of coil turns in each of the transformer circuits C1 to C3 is chosen to be 100.

As can be seen from the graph, generally the inductance of each transformer circuit increases with decreasing gap length, and decreases with increasing gap length. As a result, the transfer efficiency of the transformer improves as the gap length is reduced.

Further, when the transformer circuits are compared, it is shown that the inductance of the innermost transformer circuit C1 drops significantly, compared with the middle and outermost transformer circuits C2 and C3. Accordingly, by using, out of these three transformer circuits, the middle and outermost transformer circuits C2 and C3 as a two-phase drive power transformer circuit, the unbalance between each phase of the drive power can be suppressed. Here, when the innermost transformer circuit C1 is used for transmitting the detection signal generated at the monitor electrode 31c, the "unbalance" problem does not occur.

The above description has dealt with an example of a double drive type ultrasonic motor in which both the stator-side elastic member 30 and the rotor-side elastic member 40 are provided with piezoelectric elements 31 and 41, but the invention is also applicable to a single drive type ultrasonic motor in which only the rotor-side elastic member 40 is provided with a piezoelectric element 41 but the stator-side elastic member 30 is not provided with a piezoelectric element 31.

Further, the above description has dealt with an example in which traveling waves are generated by driving the piezoelectric elements 31 and 41 with a two-phase drive signal consisting of a cosine wave and a sine wave, but traveling waves can also be generated by driving with a drive signal of three or more phases which matches the arrangement of the drive electrodes.

Figure 10:
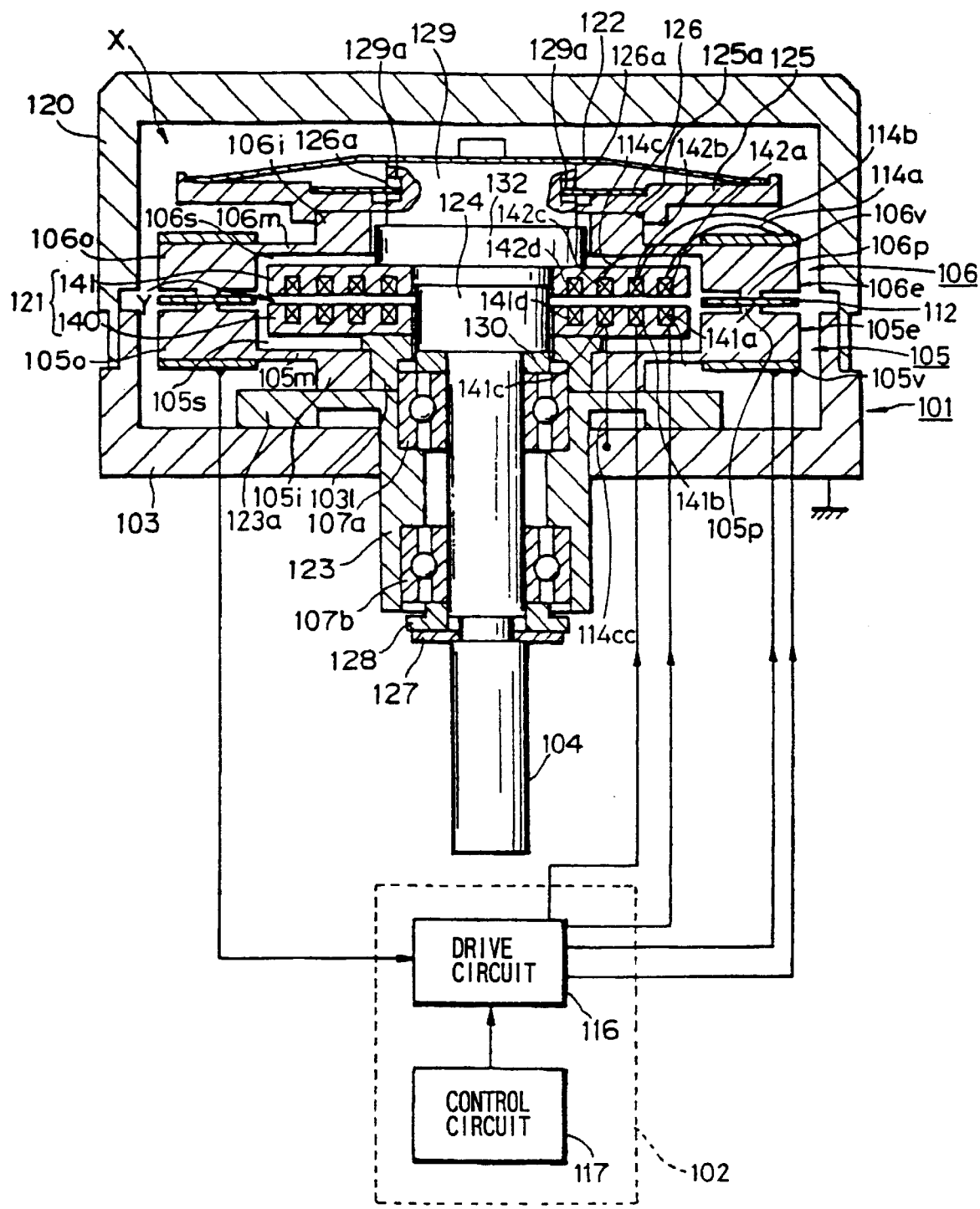
FIG. 10 is a cross sectional side elevation view showing an ultrasonic motor according to a second embodiment.

FIG. 10 is a cross sectional side elevation view showing an ultrasonic motor according to a second embodiment. The ultrasonic motor shown here comprises an ultrasonic motor main unit 101 made up of mechanical drive mechanisms and an electrical control unit 102 for driving the ultrasonic motor main unit 1.

The ultrasonic motor main unit 101 comprises a mounting base 103 which is fixed to the fixed side of a device such as a camera in which the ultrasonic motor is disposed, and a cover 120 which is fixed, for example, by a screw or the like, to the upper part of the mounting base 103 so as to cover the upper part of the mounting base 103, and contains, within an interior space X enclosed by the mounting base 103 and cover 120, a stator 105 having a circular periphery and fixed so as to be overlaid on the mounting base 103, a rotating shaft 104 passing through the center of the mounting base 103 and stator 105 and supported rotatably on bearings 107a and 107b fixed to the mounting base 103, a rotor 106 having a circular periphery and rotatable with the rotating shaft 104 while being pressed against the stator 105 by means of a Belleville spring 122 fixed to the upper end of the rotating shaft 104, and a rotor power feed unit 121 disposed within a space Y formed between the opposing stator 105 and rotor 106.

Traveling waves are excited in the circumference direction of opposing contact faces of the stator 105 and rotor 106 and, with the traveling waves engaging with each other, the phase of one traveling wave is shifted in the positive or negative direction with respect to the phase of the other traveling wave, thereby causing the engagement position to shift in the forward or backward direction, and by repeating this shift operation, the rotor 106 is caused to rotate in the forward or backward direction (this operation will be described in detail later) A cylindrically shaped bearing holder 123 of a substantially hollow structure is disposed passing through the center of the mounting base 103. An upper annular flange portion 123a of the bearing holder 123 is placed on the mounting base 103 and fixed by a screw or the like. The bearings 107a and 107b are fitted fixedly in the recesses formed in the bearing holder 123 on top of which the stator 105 is fixed, for example, by a screw or the like.

The stator 105 comprises an annular vibrator 105v formed of a piezoelectric ceramic element, and an annular elastic member 105e formed of a metal, the vibrator 105v being bonded to an outer circumferential portion of the back surface (underside in the figure) of the elastic member 105e. The elastic member 105e comprises an annular circumferential portion 105o to the back surface of which is bonded the vibrator 105v, an annular recessed portion 105s formed on the surface (upside in the figure) inward of the outer circumferential portion 105o, an annular inner circumferential portion 105i protruding in the opposite direction (downward in the figure) from the outer circumferential portion 105o and fixed to the bearing holder 123, and an annular middle portion 105m connecting the upper portion of the inner circumferential portion 105i with the lower portion of the outer circumferential portion 105o. The middle portion 105m is made thinner than the outer circumferential portion 105o and inner circumferential portion 105i, and the middle portion 105m acts to allow the outer circumferential portion 105o to vibrate easily, and serves to suppress the transmission of vibrations from the outer circumferential portion 105o to the inner circumferential portion 105i.

The rotor 106 comprises a rotor-side vibrator 106v formed of the same material as the stator-side vibrator 105v and having the same shape as the latter, and a rotor-side elastic member 106e formed of the same material as the stator-side elastic member 105e and having the same shape as the latter, the rotor-side vibrator 106v being bonded to an outer circumferential portion of the the back surface (upside in the figure) of the elastic member 106e.

In this way, in the present embodiment, since the two elastic members 105e and 106e are identical in shape, the stator 105 and rotor 106 have the same natural frequency of vibration. Furthermore, the two elastic members 105e and 106e are formed of the same material to further ensure that the stator 105 and rotor 106 have the same natural frequency of vibration, and in addition, since the two vibrators 105v and 106v are formed of the same material and are identical in shape, the natural frequency of vibration of the stator 105 is identical with that of the rotor 106.

The rotor 106 is disposed so that the rotor-side recessed portion 106s faces the stator-side recessed portion 105s. Further, as with the stator 105, the vibrator 106v is bonded to an outer circumferential portion 106o of the back surface (upside in the figure) of the rotor 106, and the thin middle portion 106m connecting between the outer circumferential portion 106o and inner circumferential portion 106i of the rotor 106, like the thin middle portion 105m of the stator 105, acts to allow the outer circumferential portion 106o to vibrate easily and serves to suppress the transmission of vibrations from the outer circumferential portion 106o to the inner circumferential portion 106i.

The rotating shaft 104 passes through the center of the bearing holder 123, stator 105, and rotor 106, and is supported rotatably on the bearings 107a and 107b. An annular first flange portion 124 is formed upwardly of the position where the rotating shaft 104 is supported on the upper bearing 107a, and an annular gap ring 130 is inserted between the first flange portion 124 and the inner ring of the upper bearing 107a.

The lower part of the rotating shaft 104 protrudes downward from the bearing holder 123 and outward from the mounting base 103. This protruding lower part is fitted with a snap ring 127, for example, a C-ring, in a vertically movable manner, and a bush 128 is inserted between the snap ring 127 and the inner ring of the lower bearing 107b.

This snap ring 127 is fitted onto the rotating shaft 104 after the rotating shaft 104 in the rotor-side assembly (which includes the rotating shaft 104, the rotor 106, and the rotor-side core 141 of the rotary transformer 121 described later) is inserted from the upward direction in the figure into the stator-side assembly (which includes the bearings 107a, 107b, the bearing holder 123, the stator 105, and the stator-side core 140 of the rotary transformer 121 described later).

The upward movement of the rotating shaft 104 is limited by the snap ring 127 and the bush 128, while the downward movement is limited by the gap ring 130. That is, the snap ring 127, the bush 128, and the gap ring 130 together limit the vertical movements of the rotating shaft 104. Further, the vertical positioning of the rotating shaft 104 is defined by the thickness of the gap ring 130.

An annular second flange portion 129 is formed in the upper part the rotating shaft 104, and an umbrella-shaped Belleville spring 122 is screwed to the upper part of the second flange portion 129. A plurality of loosely engaging grooves 129a extending in the radial direction are formed at equally spaced intervals around an outer circumferential face of the second flange 129.

Between the Belleville spring 122 and the rotor-side elastic member 106e is disposed an annular spring base 125 through which the second flange portion 129 is disposed in slidable fashion (clearance fit to the second flange portion 129). An upper outer circumferential portion of the spring base 125 is made to butt against an outer circumferential edge of the Belleville spring 122. An annular plate 126 is fixed to an upper inner circumferential portion of the spring base 125, and a plurality of equally spaced protrusions 126a, which loosely engage with the loosely engaging grooves 129a, are formed around the inner circumference of the plate 126. Thus, the spring base 125 is made rotatable with the rotating shaft 104 and movable vertically in sliding fashion.

An annular recessed portion 125a is formed in a lower inner circumferential portion of the spring base 125, with which annular recessed portion 125a the inner circumferential portion 106i of the rotor-side elastic member 106e engages to position in the axial direction (centering with respect to the axial center of the rotating shaft 104), and in this condition, the inner circumferential portion 106i is fixed to the spring base 125 by means of a screw or the like. Thus, the rotor 106 is capable of rotating with the spring base 125 and rotating shaft 104, and is, at all times, biased downward by the Belleville spring 122 via the spring base 125.

The stator-side elastic member 105e includes an annular protrusion 105p with a narrow width, formed integrally with the surface of the outer circumferential portion 105o, and likewise, the rotor-side elastic member 106e includes an annular protrusion 106p with a narrow width, formed integrally with the surface of the outer circumferential portion 106o. These protrusions 105p and 106p are identical in shape and arranged opposite each other. When the stator- and rotor-side elastic members 105e and 106e were pressed together with their entire surfaces contacting each other, most of the vibrations at the exciting side would be transmitted to the other side and the amount of displacement of the traveling wave would decrease, but here, the protrusions 105p and 106p formed on the stator- and rotor-side elastic members 105e and 106e serve to prevent the contact faces from spreading over the entire surfaces, as a result of which the proper traveling wave can be maintained on the stator- and rotor-side protrusions 105p and 106p.

An annular buffering friction member 112 formed, for example, from a resin or the like is interposed between the stator-side protrusion 105p and the rotor-side protrusion 106p, and these protrusions are held pressed on the buffering friction member 112. That is, the rotor-side protrusion 106p is pressed against the stator-side protrusion 105p via the buffering friction member 112 by the elastic force of the Belleville spring 122.

The buffering friction member 112 here performs the function of a vibration low pass filter, and acts to make it difficult for the traveling wave generated on the stator-side protrusion 105p or the rotor-side protrusion 106p to be transmitted to the other side, thus preventing interference between the traveling wave on the stator-side elastic member 105e and the traveling wave on the rotor-side elastic member 106e and ensuring generation of the proper traveling wave on each side, while at the same time, preventing the metal portions (the protrusions 105p and 106p) from directly contacting each other, thereby avoiding the generation of abnormal noise and improving the durability of the press-contact faces. Here, the buffering friction member 112 may be fixed to one or the other of the protrusions, or may be just interposed between the protrusions 105p and 106p without being fixed to either of them.

It should particularly be noted in the present embodiment that the space Y formed between the opposing stator- and rotor-side recessed portions 105s and 106s is utilized to accommodate the non-contact rotary power feed unit 121 used as the rotor power feed unit. In the present embodiment, a rotary transformer is used for the non-contact power feed unit 121.

The rotary transformer 121 comprises an annular stator-side core 140 and a rotor-side core 141 identical in shape to the stator-side core 140 and disposed opposite it. The stator-side core 140 is bonded to the upper surface of an annular core plate 131 press-fitted to the inner circumferential face of the inner circumferential portion 105i of the stator-side elastic member 105e, while the rotor-side core 141 is bonded to the back surface of an annular third flange portion 132 formed between the first and second flange portions 124 and 129 of the rotating shaft 104. The gap between the stator-side core 140 and the rotor-side core 141 is set at a predetermined value defined by the thickness of the gap ring 127.

Four annular grooves are formed in concentric fashion on each of the stator- and rotor-side cores 141 and 142, with the annular grooves on one side facing the corresponding annular grooves on the other side, and stator-side coils 141a to 141d and rotor-side coils 142a to 142d are disposed in the respective grooves. The stator-side coils 141a and 141b are primary coils, the former for supplying a first component of a second drive signal and the latter for supplying a second component of the second drive signal, and the stator-side coils 141c and 141d are a primary coil for grounding and a spare primary coil used when the motor is a three-phase ultrasonic motor. The rotor-side coils 142a to 142d facing these stator-side coils 141a to 141d are a secondary coil for supplying the first component of the second drive signal, a secondary coil for supplying the second component of the second drive signal, a secondary coil for grounding, and a spare secondary coil, respectively. Preferably, the first and second components are sine waves, 90 degrees apart in phase, but they may be supplied as rectangular waves.

Figure 11:
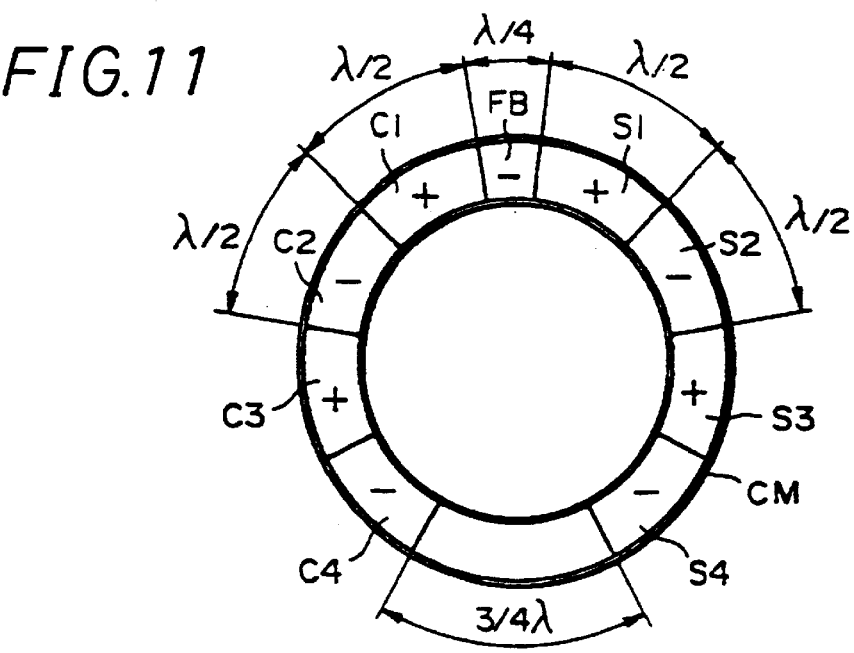
FIG. 11 is a plan view showing one side of a stator-side vibrator or a rotor-side vibrator.

FIG. 11 is a plan view showing one side of the stator-side vibrator 105v or the rotor-side vibrator 106v. The vibrator 105v or 106v comprises an annular piezoelectric ceramic plate CM, and four first electrodes S1 to S4 and four second electrodes C1 to C4 formed on one side of the piezoelectric ceramic plate CM. The first electrodes S1 to S4 and C1 to C4 are equally spaced apart by 36 degrees in terms of mechanical angle so that the vibrator generates a standing wave of five wavelengths (5λ) around the entire circumference. The first electrodes S1 to S4 and the second electrodes C1 to C4 are polarized in advance so that the polarization direction across the thickness reverses between adjacent regions (as marked with + and − in the figure). The electrodes S1 to S4 and C1 to C4 are formed without leaving any gap to the inner circumferential edge or outer circumferential edge of the annular piezoelectric ceramic plate CM.

Figure 12:
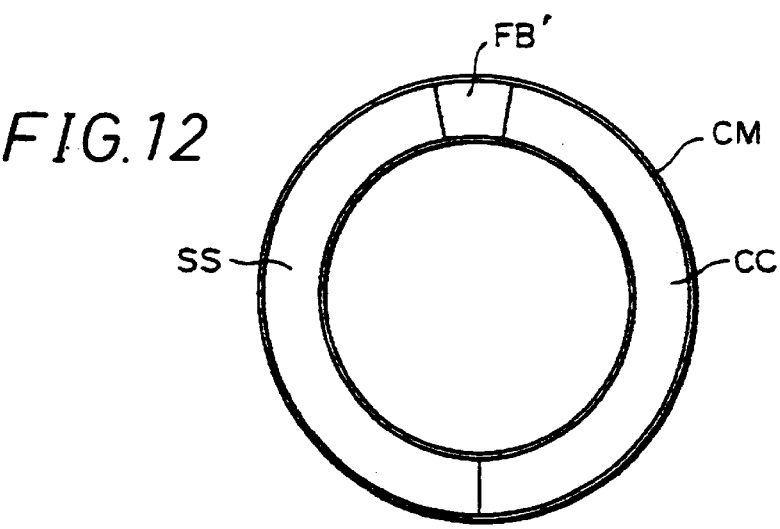
FIG. 12 is a plan view showing the other side of the stator-side vibrator or the rotor-side vibrator.

FIG. 12 is a plan view showing the other side of the stator-side vibrator 105v or the rotor-side vibrator 106v. On the other side of the piezoelectric ceramic plate CM are formed a first-side electrode SS opposite the entire region where the electrodes S1 to S4 are formed on the one side of the piezoelectric ceramic plate CM, and a second-side electrode CC opposite the entire region where the second electrodes C1 to C4 are formed on the one side of the piezoelectric ceramic plate CM. Between the first-side electrode SS and the second-side electrode CC are formed feedback electrodes FB and FB' opposing each other and each having an angle of 18 degrees in terms of mechanical angle or 90 degrees in terms of electrical angle.

Referring back to FIG. 10, the entire surface of the one side of the stator-side vibrator 105v is bonded to the back surface of the metal elastic member 105e by means of an adhesive or a conductive adhesive. Generally, even when a non-conductive adhesive is used, electrical conduction occurs between the two members with microscopic roughened portions on the machined surfaces contacting each other because the adhesive thickness is thin. The metal elastic member 105e is connected electrically to the mounting base 103, and as a result, the electrodes S1 to S4, FB, and C1 to C4 formed on the one side of the stator-side vibrator 105v are connected to ground.

On the other hand, the first-side electrode SS and second-side electrode CC of the stator-side vibrator 105v are connected to a drive circuit 116.

The drive circuit 116 applies, between the ground and the first-side electrode SS of the stator-side vibrator 105v, a sinusoidal voltage signal as a first component of a first drive signal and, between the ground and the second-side electrode CC, a sinusoidal voltage signal as a second component of the first drive signal which has a 90-degree phase difference with respect to the first component. The drive circuit 16 is supplied with a piezoelectric voltage signal representing the displacement detection signal produced between the feedback electrodes FB and FB' in response to the amount of displacement of the vibrator 5v and, based on the supplied displacement detection signal, the phase and frequency of the sinusoidal voltage signals to be supplied to the stator-side vibrator 105v are maintained constant.

On the other hand, the entire surface of the one side of the rotor-side vibrator 106v is bonded to the back surface of the metal elastic member 106e by means of an adhesive or a conductive adhesive. The metal elastic member 106e is electrically connected to the mounting base 103 via internal wiring 114c, rotor-side coil 142c, stator-side coil 141c, and internal wiring 114cc electrically connected in sequence to the metal elastic member 106e, and as a result, the electrodes S1 to S4, FB, and C1 to C4 formed on the one side of the rotor-side vibrator 106v are connected to ground.

On the other hand, the first-side electrode SS of the rotor-side vibrator 106v is connected to the drive circuit 116 via internal wiring 114a, rotor-side coil 142a, and stator-side coil 141a electrically connected in sequence to the first-side electrode SS. The second-side electrode CC of the rotor-side vibrator 106v is connected to the drive circuit 116 via internal wiring 114b, rotor-side coil 142b, and stator-side coil 141b electrically connected in sequence to the second-side electrode CC.

The drive circuit 116 applies, between the ground and the first-side electrode SS of the rotor-side vibrator 106v, a sinusoidal voltage signal as the first component of the second drive signal and, between the ground and the second-side electrode CC, a sinusoidal voltage signal as the second component of the second drive signal which has a 90-degree phase difference with respect to the first component.

Next, the operation of the thus constructed ultrasonic motor will be described in further detail along with the operation of the drive circuit 116. When the first drive power as the first component of the first drive signal is supplied from the drive circuit 116 to the first-side electrode SS of the vibrator 5v, the vibrator 105v is excited and a standing wave of five wavelengths is generated on the surface of the elastic member along the circumference direction thereof.

Here, since the outer circumferential portion 105o to which the vibrator 105v is bonded is allowed to vibrate by the presence of the thin middle portion 105m, as earlier described, the standing wave is generated on the surface of the outer circumferential portion 105o of the stator 105.

When the second drive power as the second component of the first drive signal, which has a 90-degree phase difference with respect to the first drive power, is supplied to the second-side electrode CC, a standing wave of five wavelengths is generated on the surface of the outer circumferential portion 105o of the stator 105 along the circumference direction thereof. Since the first-side electrode SS and the second-side electrode CC are spaced apart from each other by 90 degrees in terms of electrical angle, as earlier noted, the two standing waves are 90 degrees apart in phase.

Accordingly, when the first drive power and second drive power from the drive circuit 116 are simultaneously supplied to the stator-side vibrator 105v, a traveling rotational wave due to the sum wave is generated on the surface of the outer circumferential portion 105o of the stator 105. Likewise, when the first drive power and second drive power are simultaneously supplied to the rotor-side vibrator 106v via the rotary transformer 121, a traveling rotational wave due to the sum wave is generated on the surface of the outer circumferential portion 106o of the rotor 106.

In the present embodiment, the control circuit 117 first controls the drive circuit 116 so that the drive circuit 116 supplies the two-phase first drive signal of frequency f to the stator-side vibrator 105v and the two-phase second drive signal of the same frequency f to the rotor-side vibrator 106v.

Figure 13:
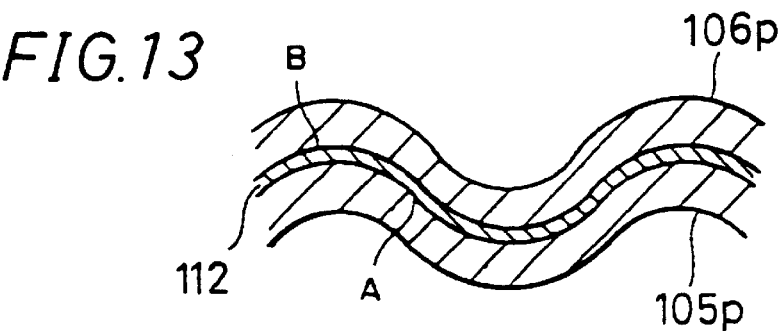
FIG. 13 is a cross sectional view of a stator/rotor contact portion cut along the circumference direction thereof when traveling waves are generated.

Since the stator 105 and rotor 106 have the same natural frequency of vibration, as earlier noted, when the frequency f is set equal or nearly equal to the natural frequency of vibration of the stator 105 and rotor 106, the traveling wave A generated on the protrusion 105p of the stator-side outer circumferential portion 105o becomes identical with the traveling wave B generated on the protrusion 106p of the rotor-side outer circumferential portion 106o, and the two waves thus lock with each other, as shown in FIG. 13, just as gears engage with each other. As a result, the rotor 106 is locked in the stopped condition. In the present embodiment, the frequency f is set, for example, to 50 kHz.

In this condition, when the control circuit 117 controls the drive circuit 116 so that the drive circuit 116 supplies the two-phase first drive signal of frequency f to the stator-side vibrator 105v and the two-phase second drive signal of frequency (f+$\Delta$f) to the rotor-side vibrator 106v, then the rotor-side traveling wave B tries to advance relative to the stator-side traveling wave A with the two waves engaging with each other, as a result of which the engagement lock position of the traveling waves A and B moves in the propagating direction of the traveling waves, causing the rotor 106 to rotate in the forward direction while the stator 105 is held stationary.

On the other hand, when the control circuit 117 controls the drive circuit 116 so that the drive circuit 116 supplies the two-phase first drive signal of frequency f to the stator-side vibrator 105v and the two-phase second drive signal of frequency (f−$\Delta$f) to the rotor-side vibrator 106v, then the rotor-side traveling wave B tries to lag relative to the stator-side traveling wave A with the two waves engaging with each other, as a result of which the engagement lock position of the traveling waves A and B moves in the direction opposite to the propagating direction of the traveling waves, causing the rotor 106 to rotate in the backward direction while the stator 105 is held stationary.

Furthermore, when the amount of the frequency change, ∓$\Delta$f, is increased or decreased, the rotational speed of the rotor 106 increases or decreases. The rotational speed (rpm) defined by the value of ±$\Delta$f indicates the synchronous rotational speed determined by 60×$\Delta$f/wavelength, for example, in the five-wave type of FIG. 11, 60×⅕=12 rpm when $\Delta$f is 1 Hz.

As described above, in the present embodiment, the two elastic members 105e and 106e are made identical in shape so that the stator 105 and rotor 106 will have the same natural frequency of vibration, and as a result, when signals whose frequencies are equal to or nearly equal to the resonant frequency of the stator 105 and rotor 106 are supplied to the respective vibrators 105v and 106v, the generated traveling waves A and B lock with each other, just as gears engage with each other, thus locking the rotor 106 in the stopped condition, and when the phase of one signal is shifted in the positive or negative direction with respect to the phase of the other signal, the engagement lock position shifts in the forward or backward direction and, by repeating this shift operation, the rotor 106 is caused to rotate in the forward or backward direction.

In this way, in the ultrasonic motor whose stator 105 and rotor 106 are provided with the respective vibrators 105v and 106v, when the two elastic members 105e and 106e are made identical in shape, the rotation of the rotor 106 can be regulated in a well controlled manner.

It must be noted, however, that the natural frequencies of the stator 105 and rotor 106 shift because of changes in temperature, humidity, load, applied pressure, drive power, etc., and when there is a difference in amount of shift in the natural frequency between the stator 105 and rotor 106, the locked condition of the traveling waves A and B could not be maintained, but since the two vibrators 105v and 106v are formed into the same shape and of the same material, and since the two elastic members 105e and 106e are also formed into the same shape and of the same material, their natural frequencies of vibration are shifted in the same direction by the same amount.

Thus, according to the present embodiment, the rotor 106 can be regulated at all times in a well controlled manner by maintaining the traveling waves A and B in the properly locked condition.

Furthermore, since the same components can be used between the vibrators 105v and 106v and between the elastic members 105e and 106e, their costs can be reduced.

Moreover, according to the present embodiment, since the space Y formed between the opposing recessed portions 105s and 106s of the elastic members 105e and 106e of the same shape is utilized to accommodate the rotary transformer 121 used as the power feed unit for supplying a signal of prescribed frequency to the rotor-side vibrator 106v, not only can the size of the motor be reduced in the axial direction compared with the prior art, but also the need for the matching between the cover 120 and the motor mechanism, which is difficult to achieve, is eliminated, contributing to the reduction of the manufacturing costs.

Figure 14:
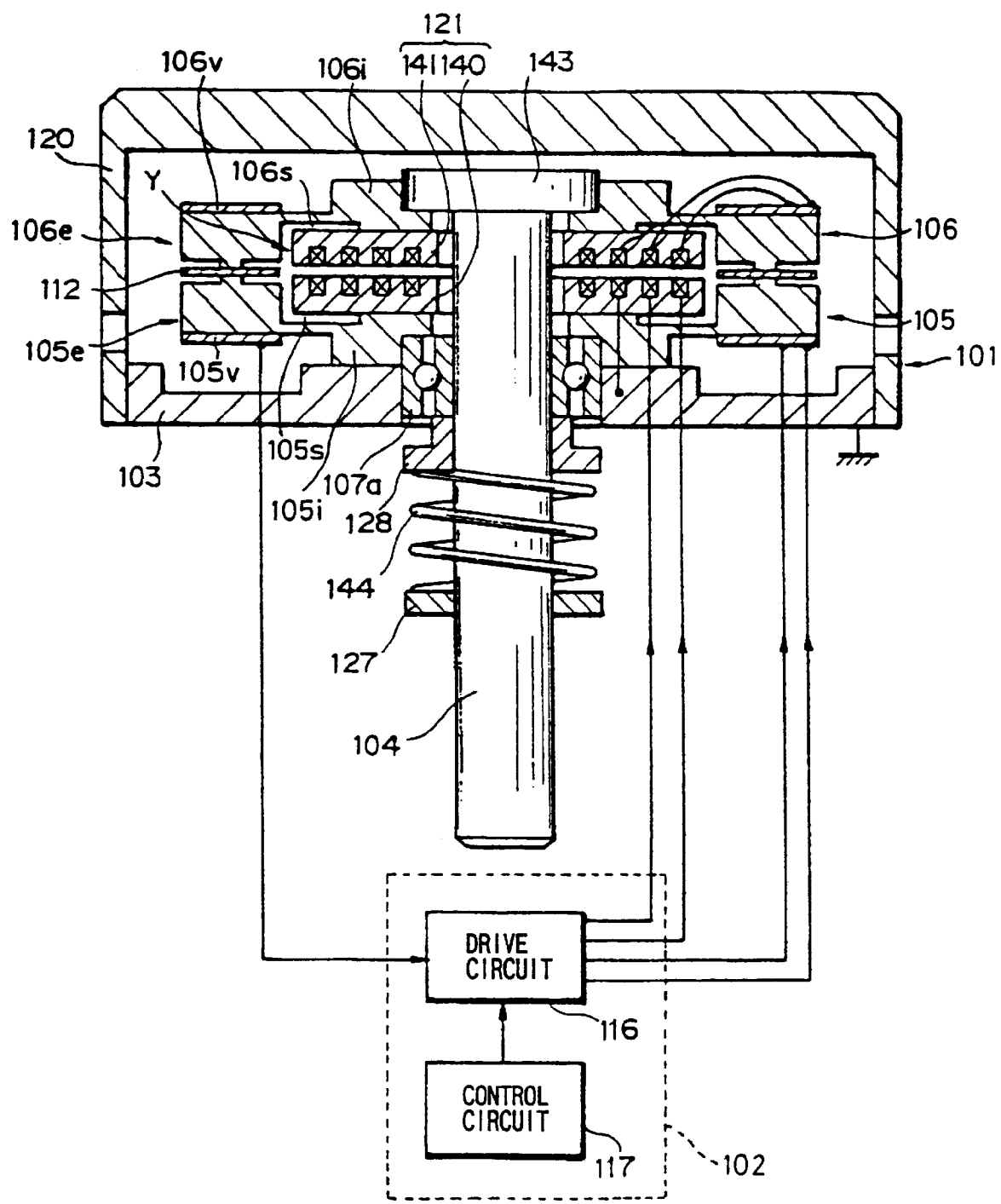
FIG. 14 is a cross sectional side elevation view showing an ultrasonic motor according to a third embodiment.

FIG. 14 is a cross sectional side elevation view showing an ultrasonic motor according to a third embodiment. The ultrasonic motor of the third embodiment differs from that of the second embodiment in that the Belleville spring 122 is replaced by a compression spring 144 as the biasing means for pressing the stator and rotor together, and in that the rotating shaft 104 is supported on a single bearing 107a. With these changes, various modifications are made.

That is, the bearing 107a is fixedly fitted in the mounting base 103 and the inner circumferential portion 105i of the stator-side elastic member 105e, and the rotating shaft 104 is rotatably supported on this bearing 107a. The rotating shaft 104 has only one flange portion 143 in an upper part thereof, and the inner circumferential portion 106i of the rotor-side elastic member 106e is press-fitted onto this flange portion 143.

The lower part of the rotating shaft 104 is fitted with a snap ring 127 such as a C-ring, and the compression spring 144 is disposed between the snap ring 127 and the bearing 107a via a bush 128. The rotating shaft 104 and the rotor 106 are at all times biased downward by the compression spring 144, and the stator-side protrusion 105p and the rotor-side protrusion 106p are pressed against each other via the buffering friction material 112, as in the second embodiment.

As in the second embodiment, the stator-side core 140 is bonded to the upper surface of the inner circumferential portion 105i of the stator-side elastic member 105e, and the rotor-side core 141 to the back surface of the inner circumferential portion 106i of the rotor-side elastic member 106e, and the rotary transformer 121 is disposed utilizing the space Y.

It will be appreciated that the same effect as obtained in the second embodiment can be achieved with the above construction.

Figure 15:
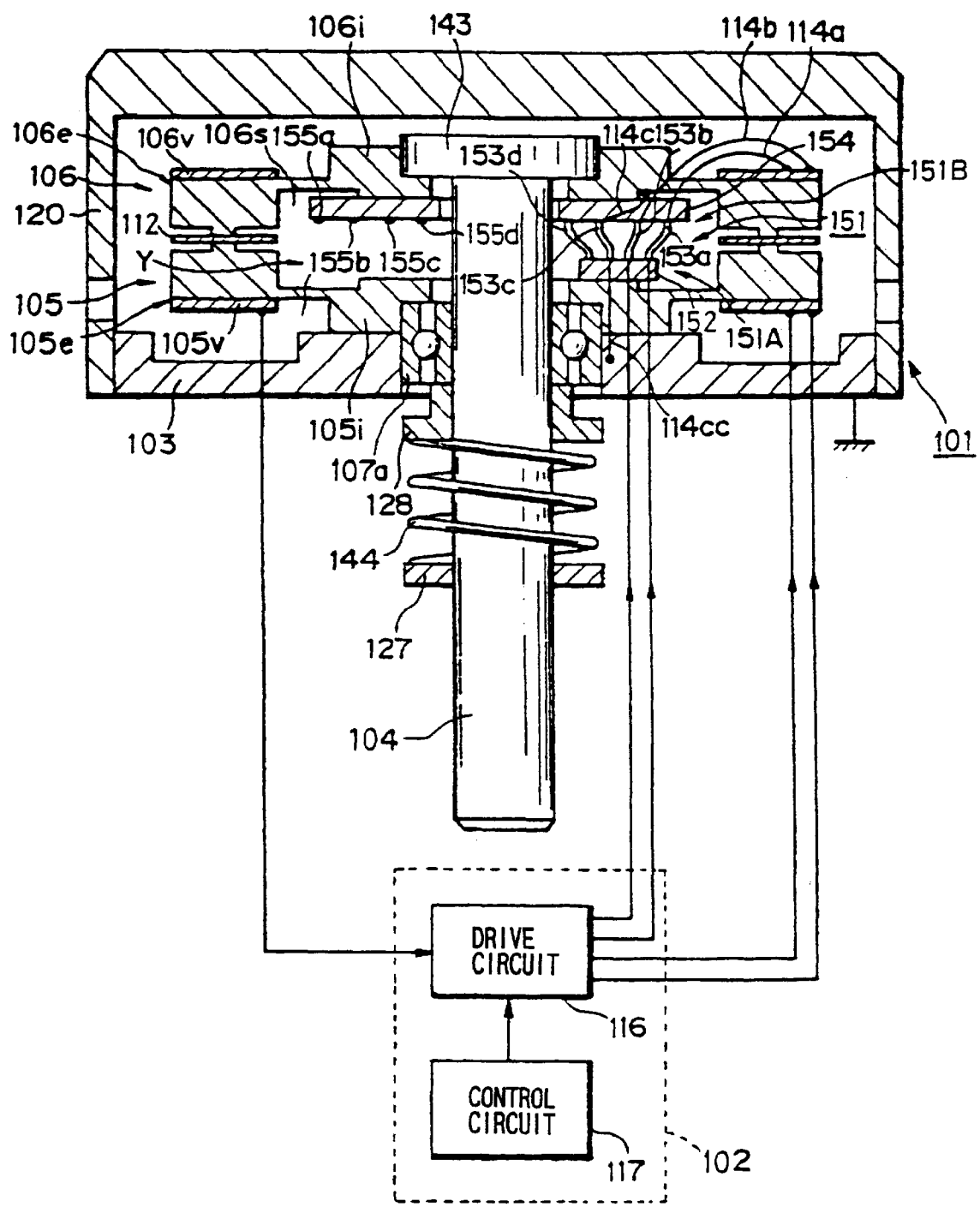
FIG. 15 is a cross sectional side elevation view showing an ultrasonic motor according to a fourth embodiment.

FIG. 15 is a cross sectional side elevation view showing an ultrasonic motor according to a fourth embodiment. The ultrasonic motor of the fourth embodiment differs from that of the third embodiment in that the non-contact rotary power feed unit 121 is replaced by a contact rotary power feed unit, i.e., a brush contact power feed unit 151, as the rotor power feed unit disposed in the space Y.

The brush contact power feed unit 151 comprises a stator-side power feed unit 151A and a rotor-side power feed unit 151B. The rotor-side power feed unit 151B comprises an annular base 154 fixed to the back surface of the inner circumferential portion 106i of the rotor-side elastic member 106e so as to be coaxial with the rotating shaft 104, and four annular conductors 155a to 155d formed in concentric fashion on the back surface of the base 154.

On the other hand, the stator-side power feed unit 151A comprises a brush base 152 fixed to the upper surface of the inner circumferential portion 105i of the stator-side elastic member 105e so as to face a portion of the annular base 154, and four positive conductive brushes 153a to 153d attached to the upper surface of the brush base 152 and contacting the respective conductors 155a to 155d in rubbing fashion. The positive conductive brushes 153a to 153d are, respectively, a brush for supplying the first component of the second drive signal, a brush for supplying the second component of the second drive signal, a grounding brush, and a spare brush.

The first-side electrode SS of the rotor-side vibrator 106v is connected to the drive circuit 116 via the internal wiring 114a, conductor 155a, and conductive brush 153a electrically connected in sequence to the first-side electrode SS. The second-side electrode CC of the rotor-side vibrator 106v is connected to the drive circuit 116 via the internal wiring 114b, conductor 155b, and conductive brush 153b electrically connected in sequence to the second-side electrode CC. The electrodes S1 to S4, FB, and C1 to C4 formed on one side (underside in the figure) of the rotor-side vibrator 106v are electrically connected to the mounting base 103, and hence to ground, via the metal elastic member 106e, internal wiring 114c, conductor 155c, conductive brush 153c, and internal wiring 114cc electrically connected in sequence to these electrodes.

It will be appreciated that the same effect as obtained in the third embodiment can be achieved with the above construction.

The present invention has been described above in connection with the preferred embodiments thereof, but the invention is not limited to the particular embodiments described above, and it will be recognized that various modifications can be made without departing from the scope of the invention, for example, in the fourth embodiment, the conductive brushes 153a to 153d are fixed to the stator side and the conductors 155a to 155d to the rotor side, but conversely, the conductive brushes 153a to 153d may be fixed to the rotor side and the conductors 155a to 155d to the stator side.

Further, the above embodiments have been described as applied to ultrasonic motors which generate traveling waves by applying two-phase drive signals, but these embodiment are equally applicable to ultrasonic motors which generate traveling waves by applying three-phase drive signals. In fact, in the above embodiments, the spare coils 141d and 142d or the spare brush 153d and spare conductor 155d are included, as described above, to provide for three-phase drive signals.

ADVANTAGEOUS EFFECTS OF THE INVENTION

As described in detail above, according to the present invention, since power is supplied to the rotor-side vibrating element using a rotary transformer and thus achieving a space saving, stable, and non-contact power feed construction, a compact and high-output ultrasonic motor can be realized.

When driving the rotor-side vibrating element with N-phase drive power, since, of the plurality of concentrically arranged transformer circuits, N transformer circuits starting from the outermost transformer circuit are used to supply power, the unbalance between each phase of the drive power can be suppressed.

Further, by using a rotary transformer whose step-up ratio Nr is larger than 1, the rotary transformer can be used as a substitution for a fixed transformer for the rotor-side vibrating element, and thus the number of components can be reduced.

Moreover, by setting the ratio Nr/Ns between the step-up ratio Nr of the rotary transformer and the step-up ratio Ns of the fixed transformer for the stator-side vibrating element within the range of 0.5 to 2, the unbalance of the supply power or drive voltages to the stator-side and rotor-side vibrating elements can be eliminated.

Furthermore, according to the ultrasonic motor of the invention, since the two elastic members are made substantially identical in shape, the stator and rotor can be constructed to have the same natural frequency of vibration. Accordingly, by supplying signals whose frequencies are equal to or nearly equal to the resonant frequency of the stator and rotor to the respective vibrators, the traveling waves generated on their press-contact faces can be made to lock with each other. As a result, by successively shifting the engagement lock position of the traveling waves, the rotation of the rotor can be regulated in a well controlled manner.

Further, since the space formed between the opposing recessed portions of the elastic members is utilized to accommodate the power feed unit for supplying a signal of prescribed frequency to the rotor-side vibrator thus eliminating the need for particularly providing a space for accommodating the power feed unit along the axial direction of the motor, not only can the size of the motor be reduced in the axial direction compared with the prior art, but also the need for the matching between the cover and the motor mechanism, which is difficult to achieve, is eliminated, contributing to reducing the manufacturing costs.

Furthermore, since the same components can be used between the respective elastic members, their costs can be reduced.

What is claimed is:

1. An ultrasonic motor comprising:
a stator-side elastic member having a rotationally symmetrical press-contact face;
a rotor-side elastic member having a rotationally symmetrical press-contact face facing the press-contact face of the stator-side elastic member, the rotor-side elastic member being supported so as to be angularly displaceable about a rotation symmetry axis;
a stator-side vibrating element for generating a rotational displacement wave of frequency Fs on the press-contact face of the stator-side elastic member;
a rotor-side vibrating element for generating a rotational displacement wave of frequency Fr on the press-contact face of the rotor-side elastic member, the rotor-side elastic member being angularly displaced at a rotational speed proportional to a frequency difference $\Delta F$ between the frequency Fs and the frequency Fr; and
a rotary transformer for supplying drive power having a phase difference equivalent to N phases (N is an integer equal to or more than 2) to the rotor-side vibrating element which is angularly displaced together with the rotor-side elastic member, the rotary transformer including more than N transformer circuits concentrically arranged, N transformer circuits which are sequentially arranged inwardly from an outermost one being used as drive power transformer circuits.

2. The ultrasonic motor of claim 1, wherein an innermost one of the transformer circuits is used as a detection signal transformer circuit for transmitting a detection signal resulting from the detection of the rotational displacement wave generated on the press-contact face of the rotor-side elastic member.

3. The ultrasonic motor of claim 2, wherein the stator-side vibrating element and the rotor-side vibrating element, respectively, are rotationally symmetrical piezoelectric elements attached to surfaces of the stator-side and rotor-side elastic members, which surfaces are opposite to the press-contact faces thereof,
first and second drive electrodes for two-phase driving and a monitor electrode for detecting a vibrating wave are formed on a surface of each of the piezoelectric elements,
the first and second drive electrodes are respectively connected to the drive power transformer circuits, and the monitor electrode is connected to the detection signal transformer circuit.

4. The ultrasonic motor of claim 3, wherein a nonmagnetic material for suppressing magnetic coupling is interposed between a detection core forming the detection signal transformer circuit and a drive core forming the drive power transformer circuits.

5. An ultrasonic motor comprising:
a stator-side elastic member having a rotationally symmetrical press-contact face;
a rotor-side elastic member having a rotationally symmetrical press-contact face facing the press-contact face of the stator-side elastic member, the rotor-side elastic member being supported so as to be angularly displaceable about a rotation symmetry axis;
a rotor-side vibrating element for generating a rotational displacement wave on the press-contact face of the rotor-side elastic member, the rotor-side elastic member being angularly displaced by the rotational displacement wave; and
a rotary transformer for supplying drive power having a phase difference equivalent to N phases (N is an integer equal to or more than 2) to the rotor-side vibrating element which is angularly displaced together with the rotor-side elastic member,
the rotary transformer including more than N transformer circuits concentrically arranged, N transformer circuits which are sequentially arranged inwardly from an outermost one being used as drive power transformer circuits.

6. An ultrasonic motor comprising:
a stator-side elastic member having a rotationally symmetrical press-contact face;
a rotor-side elastic member having a rotationally symmetrical press-contact face facing the press-contact face of the stator-side elastic member, the rotor-side elastic member being supported so as to be angularly displaceable about a rotation symmetry axis;
a stator-side vibrating element for generating a rotational displacement wave of frequency Fs on the press-contact face of the stator-side elastic member;
a rotor-side vibrating element for generating a rotational displacement wave of frequency Fr on the press-contact face of the rotor-side elastic member, the rotor-side elastic member being angularly displaced at a rotational speed proportional to a frequency difference $\Delta F$ between the frequency Fs and the frequency Fr; and
a rotary transformer, disposed on the rotation symmetry axis side with respect to the press-contact faces of the stator- and rotor-side elastic members, for supplying power to the rotor-side vibrating element which is angularly displaced together with the rotor-side elastic member,
a step-up ratio Nr of the rotary transformer being larger than 1.

7. The ultrasonic motor of claim 6, further comprising:
a fixed transformer for supplying power to the stator-side vibrating element,
wherein a ratio Nr/Ns between the step-up ratio Nr of the rotary transformer and the step-up ratio Ns of the fixed transformer satisfies a relation of $0.5 \leq Nr/Ns \leq 2$.

8. An ultrasonic motor comprising:
a stator-side elastic member having a rotationally symmetrical press-contact face;
a rotor-side elastic member having a rotationally symmetrical press-contact face facing the press-contact face of the stator-side elastic member, the rotor-side elastic member being supported so as to be angularly displaceable about a rotation symmetry axis;
a rotor-side vibrating element for generating a rotational displacement wave on the press-contact face of the rotor-side elastic member, the rotor-side elastic member being angularly displaced by the rotational displacement wave; and
a rotary transformer for supplying power to the rotor-side vibrating element which is angularly displaced together with the rotor-side elastic member,
a step-up ratio Nr of the rotary transformer being larger than 1.

9. An ultrasonic motor comprising:
a stator having a stator-side elastic member and a stator-side vibrator attached to the stator-side elastic member; and a rotor having a rotor-side elastic member facing and pressed against the stator-side elastic member and a rotor-side vibrator attached to the rotor-side elastic member, the vibrators being caused to vibrate by supplying signals of prescribed frequency to the respective vibrators, the rotor being driven by means of traveling waves generated on the press-contact faces of the respective elastic members by the vibrations, wherein the stator-side elastic member and the rotor-side elastic members are respectively provided with recessed portions opposing each other and are formed into substantially the same shape, and a power feed unit for supplying the signal of the prescribed frequency to the rotor-side vibrator is disposed within a space formed between the opposing recessed portions.

10. The ultrasonic motor of claim 9, wherein the power feed unit is a rotary transformer.

11. The ultrasonic motor of claim 9, wherein the power feed unit is a brush contact power feed unit comprising a conductive brush attached to either the stator or rotor side and a conductor provided at the other side, for contacting the conductive brushes in rubbing fashion.

* * * * *